United States Patent
Bageshwar et al.

(10) Patent No.: US 12,174,306 B2
(45) Date of Patent: Dec. 24, 2024

(54) METHOD AND SYSTEM TO PROCESS AND ASSURE INTEGRITY OF DME AND/OR VOR MEASUREMENTS AND MITIGATE GNSS JAMMING AND SPOOFING EVENTS

(71) Applicant: Honeywell International s.r.o., Prague (CZ)

(72) Inventors: Vibhor L. Bageshwar, Rosemount, MN (US); Zdenek Kana, Dubnany (CZ); Milos Sotak, Košice-Šaca (SK); Radek Baranek, Litovel (CZ); Radek Reznicek, Zahorovice (CZ)

(73) Assignee: Honeywell International s.r.o., Prague (CZ)

( * ) Notice: Subject to any disclaimer, the term of this patent is extended or adjusted under 35 U.S.C. 154(b) by 335 days.

(21) Appl. No.: 17/874,128

(22) Filed: Jul. 26, 2022

(65) Prior Publication Data

US 2024/0036217 A1 Feb. 1, 2024

(51) Int. Cl.
  *G01S 19/48* (2010.01)
  *G01S 19/21* (2010.01)
  *G01S 19/49* (2010.01)

(52) U.S. Cl.
  CPC .............. *G01S 19/48* (2013.01); *G01S 19/21* (2013.01); *G01S 19/49* (2013.01)

(58) Field of Classification Search
  CPC ........... G01S 19/48; G01S 19/49; G01S 19/21
  (Continued)

(56) References Cited

U.S. PATENT DOCUMENTS 5,760,737 A 6/1998 Brenner
8,736,482 B2 5/2014 Wu et al.
(Continued)

FOREIGN PATENT DOCUMENTS

CN 101046385 A 10/2007
CN 104406605 A 3/2015
(Continued)

OTHER PUBLICATIONS

European Patent Office, "Extended European Search Report", from EP Application No. 23174289.1, from Foreign Counterpart to U.S. Appl. No. 17/874,128, filed Dec. 22, 2023, pp. 1 through 13, Published: EP.

(Continued)

*Primary Examiner* — Harry K Liu
(74) *Attorney, Agent, or Firm* — Fogg & Powers LLC

(57) ABSTRACT

Methods and systems to process and assure integrity of DME and/or VOR measurements, detect the effects of GNSS jamming and/or spoofing events, identify GNSS measurements affected by the GNSS jamming and/or spoofing events, and assure the integrity of the GNSS measurements unaffected by jamming and/or spoofing events in a vehicle navigation system are disclosed. The methods are implemented to integrate inertial measurements, GNSS measurements, and DME/VOR measurements for the vehicle, and apply solution separation techniques to all of the measurements. The solution separation techniques use a main filter for hybridization of the inertial measurements, the GNSS measurements, and the DME/VOR measurements, with additional sub-solution filters and sub-sub-solution filters that use combinations of these measurements. This provides common processing of the GNSS and DME/VOR sensors in a single hybridization and solution separation framework.

20 Claims, 8 Drawing Sheets

(58) Field of Classification Search
USPC .................................................. 342/357.29
See application file for complete search history.

(56) References Cited

U.S. PATENT DOCUMENTS

| | | | |
|---|---|---|---|
| 9,360,559 | B2 | 6/2016 | MacGougan |
| 9,513,376 | B1 * | 12/2016 | Heinrich ................. G01S 19/47 |
| 9,784,847 | B1 * | 10/2017 | Barsby .................... G01S 19/48 |
| 9,885,788 | B2 | 2/2018 | Skalicky et al. |
| 10,459,085 | B1 * | 10/2019 | Bell ......................... G01S 19/40 |
| 10,760,911 | B2 | 9/2020 | Kana et al. |
| 2007/0156338 | A1 | 7/2007 | Coatantiec et al. |
| 2012/0044104 | A1 | 2/2012 | Schloetzer |
| 2015/0241220 | A1 | 8/2015 | McKitterick et al. |
| 2017/0350973 | A1 | 12/2017 | Dunik et al. |
| 2018/0283871 | A1 | 10/2018 | Kana et al. |
| 2020/0001886 | A1 * | 1/2020 | Kana ......................... G01C 21/20 |
| 2021/0064847 | A1 | 3/2021 | Cypriano et al. |
| 2021/0286086 | A1 | 9/2021 | Savoy, Jr. et al. |
| 2022/0221592 | A1 | 7/2022 | Kumar et al. |
| 2024/0053485 | A1 | 2/2024 | Bageshwar et al. |

FOREIGN PATENT DOCUMENTS

| | | |
|---|---|---|
| CN | 103675844 B | 10/2015 |
| CN | 105021198 A | 11/2015 |
| CN | 105807303 B | 12/2018 |
| CN | 110824515 A | 2/2020 |
| CN | 111007555 A | 4/2020 |
| CN | 111025363 A | 4/2020 |
| CN | 114152958 A | 3/2022 |
| CN | 114235007 A | 3/2022 |

OTHER PUBLICATIONS

European Patent Office, "Extended European Search Report", from EP Application No. 23174722.1, from Foreign Counterpart to U.S. Appl. No. 17/874,104, filed Jan. 8, 2024, pp. 1 through 14, Published: EP.

Geng et al., "Applications of multi-height sensors data fusion and fault-tolerant Kalman filter in integrated navigation system of UAV", Procedia Computer Science, vol. 103, Feb. 7, 2017, pp. 231 through 238.

McMillan et al., "Techniques for Soft-Failure Detection in a Multisensor Integrated System", Navigation: Journal of the Institute of Navigation, vol. 40, No. 3, Dec. 1, 1993, pp. 227 through 248.

Albrecht et al., "High Integrity Positioning: Lessons from the Aviation Industry" Marine Technology Society, Dynamic Positioning Conference, Oct. 12-13, 2010, Coon Rapids, MN, pp. 1 through 16.

Brenner, "Integrated GPS/Inertial Fault Detection Availability", Navigation: Journal of the Institute of Navigation, vol. 43, No. 2, Mar. 1996, pp. 111 through 130.

Vanderwerf, "FDE Using Multiple Integrated GPS/Inertial Kalman Filters in the Presence of Temporally and Spatially Correlated Ionospheric Errors", ION GPS 2001, Sep. 11-14, 2001, Salt Lake City, UT, pp. 2676 through 2685.

U.S. Patent and Trademark Office, "Office Action", U.S. Appl. No. 17/874,104, dated Aug. 5, 2024, pp. 1 through 18, Published: US.

* cited by examiner

METHOD AND SYSTEM TO PROCESS AND ASSURE INTEGRITY OF DME AND/OR VOR MEASUREMENTS AND MITIGATE GNSS JAMMING AND SPOOFING EVENTS

STATEMENT REGARDING GOVERNMENT SPONSORED RESEARCH OR DEVELOPMENT

The project leading to this application has received funding from the Clean Sky 2 Joint Undertaking under the European Union's Horizon 2020 research and innovation program under grant agreement No. 807097.

BACKGROUND

Apart from well-known signal in space (SIS) threats, a Global Navigation Satellite System (GNSS) receiver, as well as all other devices consuming GNSS signals, are exposed to other satellite constellation wide threats. For such threats, other scenarios involve satellite signal jamming and spoofing events. In spoofing scenarios, more than one satellite or all satellites can be affected. Therefore, classical receiver autonomous integrity monitoring (RAIM) and GNSS wide solution separation algorithms cannot protect a navigation system.

Distance measuring equipment (DME) and very high frequency (VHF) omni-directional range (VOR) navigation systems have been used for a long time, but the integrity of such systems have not yet been systematically resolved. Although DME and VOR systems have been used as back up for GNSS navigation, these systems have not been deployed to actively assist in GNSS jamming monitoring, spoofing monitoring, and integrity monitoring.

SUMMARY

A method and system for assuring integrity of radar measurements, detecting the effects of GNSS jamming and/or spoofing events, identifying GNSS satellite measurements affected by the GNSS jamming and/or spoofing events, and assuring the integrity of the GNSS measurements unaffected by jamming and/or spoofing events, are described herein. The method comprises computing a main filter navigation solution for a vehicle, based on a set of distance measuring equipment (DME) measurements and/or very high frequency (VHF) omni-directional range (VOR) measurements from one or more in view ground beacons (set A), and on a set of global navigation satellite system (GNSS) measurements from one or more in view GNSS satellites (set C); computing a DME/VOR navigation solution based on set A, and one or more subsets of set A, using solution separation; identifying the DME/VOR measurements in set A that provide a consistent DME/VOR position of the vehicle (set B), based on the DME/VOR navigation solution; computing a branch DME/VOR only navigation solution based on the DME/VOR measurements in set B; computing a GNSS navigation solution based on set C, and one or more subsets of set C, using solution separation; identifying the GNSS measurements in set C that provide a consistent GNSS position of the vehicle (set D), based on the GNSS navigation solution; computing a branch GNSS only navigation solution based on the GNSS measurements in set D; and verifying whether the branch GNSS only navigation solution is consistent with the branch DME/VOR only navigation solution.

If the branch GNSS only navigation solution is consistent with the branch DME/VOR only navigation solution, then the method outputs the main filter navigation solution. If the branch GNSS only navigation solution is inconsistent with the branch DME/VOR only navigation solution, then the method further comprises: computing a combined navigation solution using the DME/VOR measurements in set B, and one or more subsets of the GNSS measurements in set C, using solution separation; identifying the GNSS measurements in the one or more subsets of set C that provide a consistent GNSS position of the vehicle (set F), with respect to the DME/VOR position of the vehicle; computing a branch combined navigation solution based on set E; and verifying whether the branch combined navigation solution is consistent with the branch DME/VOR only navigation solution. If the branch combined navigation solution is consistent with the branch DME/VOR only navigation solution, then the method outputs the branch combined navigation solution. If the branch combined navigation solution is inconsistent with the branch DME/VOR only navigation solution, then the method outputs the branch DME/VOR only navigation solution.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
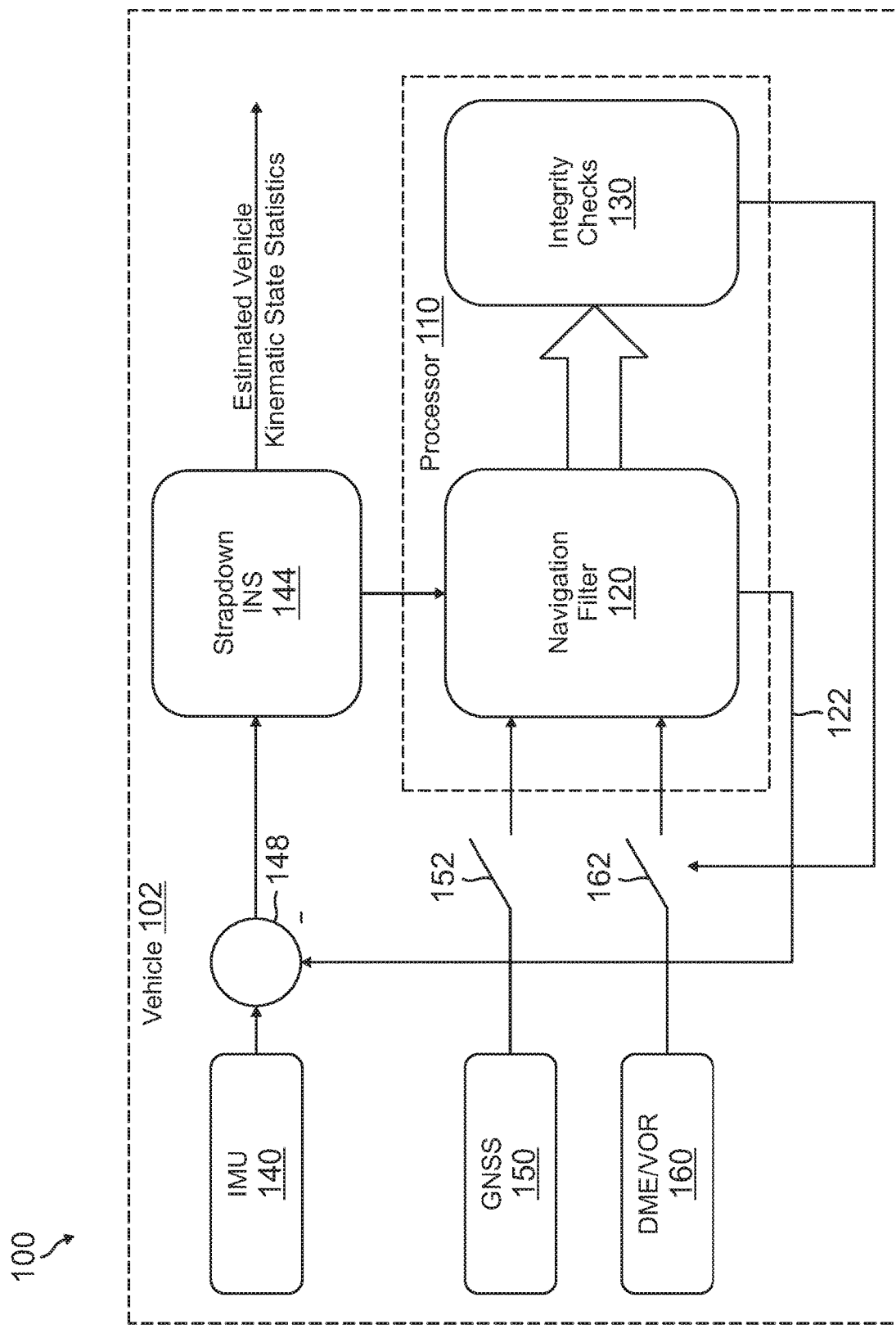
FIG. 1 is a block diagram of a system for assuring integrity of distance measuring equipment (DME) and/or VHF omni-directional range (VOR) measurements, detecting the effects of GNSS jamming and/or spoofing events, identifying the GNSS satellite measurements affected by the GNSS jamming and/or spoofing events, and assuring the integrity of the GNSS measurements unaffected by jamming and/or spoofing events, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods and systems to process and assure integrity of DME measurements and/or VOR measurements, detect the effects of GNSS jamming and/or spoofing events, identify the GNSS satellite measurements affected by the GNSS jamming and/or spoofing events, and assure the integrity of the GNSS measurements unaffected by jamming and/or spoofing events, in a vehicle navigation system, are described herein.

The present approach can be employed to resolve issues related to jamming or spoofing threats/events, and potentially any other GNSS-wide threats/events. Since DME and VOR systems are not affected by GNSS jamming and spoofing techniques, the present approach provides methods to detect, mitigate, and recover after jamming or spoofing threats/events. As DME and VOR navigation systems are already onboard aircraft, major changes are not required to the navigation systems architecture or the aircraft itself.

The present system provides for common processing of GNSS, DME, and/or VOR measurements in a single hybridization and solution separation framework. The present approach employs solution separation methodology (including main filter, sub-filter, and sub-sub-filter solutions) to incorporate DME and/or VOR measurements. This allows the threat space to be extended to include DME and/or VOR fault modes, which adds sub-solutions and sub-sub-solutions related to the DME and/or VOR fault modes, resulting in a combined pool of navigation solutions that can be used to identify various fault modes.

The threat space can be extended to include a GNSS-wide fault mode (all satellites failing at the same time), which can be monitored, and a sub-solution and, possibly, related sub-sub-solutions can be added to the solution separation framework. If the GNSS-wide fault mode is added, then there is the possibility to detect the GNSS-wide fault mode and potentially exclude GNSS measurements altogether. The GNSS-wide fault mode includes GNSS jamming and spoofing events.

The common hybridization of GNSS, DME, and/or VOR measurements enables a more precise estimation of DME and/or VOR measurement model parameters, which will provide improved performance of the navigation solution during GNSS outages (so called GNSS coasting). The present approach can also aid in recovery of the navigation system after the effects of the jamming or spoofing events are removed.

The present approach can be applied for use in various aircraft, such as a helicopter, an unmanned aerial vehicle (UAV), an unmanned aircraft system (UAS) vehicle, an urban air mobility (UAM) vehicle, or the like. The present approach is useful in various phases of flight, such as takeoff, approach, and landing, but are altitude dependent because of aiding sensor range. The present approach can also be applied to detect potential GNSS outages, such as from jamming, spoofing, or SIS issues.

The present approach provides various benefits, such as enabling stable operation of a vehicle navigation filter during GNSS outages; resolving DME/VOR discontinuities and measurement outliers; assuring integrity of DME/VOR measurements; detecting the effects of GNSS jamming and/or spoofing events; identifying the GNSS satellite measurements affected by the GNSS jamming and/or spoofing events, and assuring the integrity of the GNSS measurements unaffected by jamming and/or spoofing events.

Further details regarding the present methods and systems are described in the following sections.

Vehicle Operations in GNSS Denied Environments

During vehicle operation, various Global Navigation Satellite System (GNSS) vulnerabilities are present, such as standard SIS issues, jamming, and spoofing, which can result in the vehicle operating in a GNSS denied environment. The effects of GNSS unavailability include outages during flight critical applications, and the potential introduction of hazardously misleading information (HMI).

The present approach provides for the use of additional aiding sensor modalities to mitigate the effects of GNSS vulnerabilities. Such additional aiding sensor modalities are provided by an augmented navigation system that has an inertial sensor, a GNSS aided strapdown inertial navigation system (INS), and additional aiding sensors including one or more DME/VOR receivers. The additional aiding sensor modalities provide for the detection of jamming and spoofing events. The present approach also assures the integrity of the navigation solution estimated by the augmented navigation system.

Augmented Navigation System

The present approach integrates inertial measurements, GNSS measurements, and DME/VOR measurements, and applies a solution separation methodology on all of the measurements. The DME/VOR measurements can be "tightly" integrated so that each of the DME/VOR measurements are directly used as measurements in a hybridization filter. This allows integrity monitoring based on solution separation to be applied to the DME/VOR measurements.

In the present augmented navigation system, the INS and GNSS enable estimation of measurement model parameters of the additional aiding sensors. This allows for identification of aiding sensor discontinuities, and prevents aiding sensor measurement outliers from corrupting the navigation solution. The system can establish when to recover from a GNSS outage, and has a faster recovery once the GNSS measurements become available again.

With respect to integrity, the aiding sensor modalities are added to a solution separation framework, to assure integrity of the aiding sensor measurements. A GNSS fault mode is also provided in the solution separation framework, with fault modes included for jamming and spoofing. This provides for the detection of satellite constellation fault modes and exclusion of faulty GNSS measurements. This solution separation framework also assures the integrity of the complete navigation solution computed from the assured aiding sensor measurements and assured GNSS measurements.

The present methods enable a more precise estimation of DME/VOR measurement model parameters, which provides improved performance of the navigation solution during GNSS outages (GNSS coasting). For example, the augmented navigation system can also coast through GNSS unavailable periods if additional aiding sensor measurements such as from DME/VOR are available. The present approach also improves the length of coasting times during extended GNSS denied events. Longer coasting times are available because the additional aiding sensor measurement model parameters are estimated in real-time when the GNSS measurements are available.

The present approach augments solution separation with the additional aiding sensors including DME/VOR receivers. This provides common processing of the GNSS and DME/VOR measurements in a single hybridization and solution separation framework. The threat space is expanded to include aiding sensor fault modes, such as DME/VOR fault modes, and GNSS fault modes. The system can establish when to recover from an GNSS outage, and has a faster recovery once the GNSS measurements become available again.

A solution separation technique is used that includes a main filter for a single hybridization of inertial, GNSS, and aiding sensor measurements; and additional sub-solution filters and sub-sub-solution filters that use combinations of these measurements. For example, the ground beacons used by each aiding sensor such as a DME/VOR receiver are monitored as a sub-solution, with sub-sub-solutions monitoring redundant ground beacons used by the aiding sensors. An entire group of ground beacons used by the aiding sensors can be excluded from the navigation solution if they provide faulty measurements. Once the integrity of the navigation solution provided by the aiding sensor measurements are assured, this solution can be used to exclude GNSS signals due to jamming or spoofing. The present approach also provides for optimal allocation of the probability of HMI to different combinations of aiding sensors/solutions.

Sensor Fusion

The augmented navigation system employs sensor fusion, which is the fusion of measurement statistics from various sensors or other sources together to estimate the statistics of a set of kinematic or dynamic states, or state vector, such that the resulting uncertainty of the estimated statistics of the state vector is less than using each sensor or source individually. Various performance concepts are required to assess proper sensor fusion functionality, including accuracy, integrity, continuity, and availability.

Accuracy is the measure of the deviation between the estimated state mean vector and the true mean vector. Integrity is the ability of a system to provide timely warnings when the system should not be used for its application. Continuity is the likelihood that the measurements, software, and hardware support the accuracy and integrity requirements for the duration of the intended operation. In this regard, "continuity risk" is the probability of a detected, unscheduled interruption after initiation of an operation. Availability is the fraction of time the system is useable (complies with accuracy, integrity, and continuity requirements).

Integrity and Protection Level

There are various integrity requirements and parameters. These include an alert limit, which is the maximum allowable parameter error; time-to-alert, which is the time to annunciate that a protection level has exceeded the alert limit; protection level, which is a real-time estimated bounding error of a parameter; and integrity risk, which is the likelihood that the true error is not captured by the protection level and has exceeded the alert limit.

With respect to the protection level, an extended Kalman filter can provide an estimated state covariance matrix that does not bound the difference between the true and estimated state mean vector (the so-called state mean error vector). During real-time operation, the true state mean vector is not known. The protection level over bounds the estimated state covariance matrix to capture the state mean error vector. The protection level also provides a link between measurement vector statistics and estimated state vector statistics.

The present system computes the protection level using solution separation. The real-time statistics of the estimated state vector are computed using fusion of combinations of measurement statistics. The measurement statistics for a Kalman filter include the measurement mean vector and measurement noise covariance matrix, and higher order moments. The mean vector is typically thought of as the "measurement" of a sensor. The covariance matrix is the matrix of measurement error statistics.

DME/VOR Systems

The present augmented navigation system can include DME and/or VOR systems, in which received signals are from radio ground beacons that transmit from known locations. The present approach can combine DME with VOR systems. The DME system enables an onboard DME receiver to measure a range to a ground beacon. The VOR system enables an onboard VOR receiver to measure a bearing to a ground beacon. The International Civil Aviation Organization (ICAO) selected DME/VOR as the standardized radio navigation systems for medium area coverage, which is on the order of a few hundred kilometers.

The DME/VOR systems have the following measurement paradigms. A sensor model includes bias and noise models for range and angle measurements. A DME/VOR measurement model includes elements of the vector: $\vec{r}_{rel}$, and a constraint equation: $\vec{p}^E = \vec{r}_{rel} + \vec{r}_f$, where $\vec{p}^E$ is the vector from Earth center to the vehicle position; $\vec{r}_{rel}$ is the vector from a known ground/beacon feature (at Earth's surface) to the vehicle position, and $\vec{r}_f$ is the vector from Earth center to the known ground/beacon feature from a map.

Further details regarding the present approach are described as follows and with reference to the drawings.

FIG. 1 is a block diagram of a system 100 for assuring the integrity of DME/VOR measurements, according to one embodiment. The system 100 generally comprises at least one processor 110 onboard a vehicle 102, such as a UAM or UAS vehicle, a navigation filter 120 hosted by processor 110, and an integrity checks module 130, which operatively communicates with navigation filter 120. An onboard inertial measurement unit (IMU) 140 is operative to produce inertial measurements for vehicle 102 that are sent to a strapdown inertial navigation system (INS) 144, which operatively communicates with navigation filter 120. In addition, a GNSS receiver 150 is selectively coupled to navigation filter 120 through a switch 152, and a DME/VOR receiver 160 is selectively coupled to navigation filter 120 through a switch 162.

The navigation filter 120 is configured to receive estimated vehicle kinematic state statistics (including position, velocity, and angular orientation) produced by strapdown INS 144. The strapdown INS 144 is configured to generate the estimated vehicle kinematic state statistics based on integration of the inertial measurements from IMU 140. A correction signal 122 is sent from navigation filter 120 to an input of a subtractor 148, which is also configured to receive the inertial measurements from IMU 140. A differential signal between correction signal 122 and the inertial measurements is output from subtractor 148 to strapdown INS 144 to update the estimated vehicle kinematic state statistics. These updated statistics are sent to other vehicle systems and also fed back to navigation filter 120 for further processing.

The state space for system 100 is defined by a state error vector, $\delta X$, a process noise vector, $W$, and a measurement error vector, $\delta z$. In system 100, navigation filter 120 and integrity checks module 130 operate together to provide a solution separation method that is applied to the measurements from strapdown INS 144, GNSS receiver 150, and DME/VOR receiver 160.

Figure 2A:
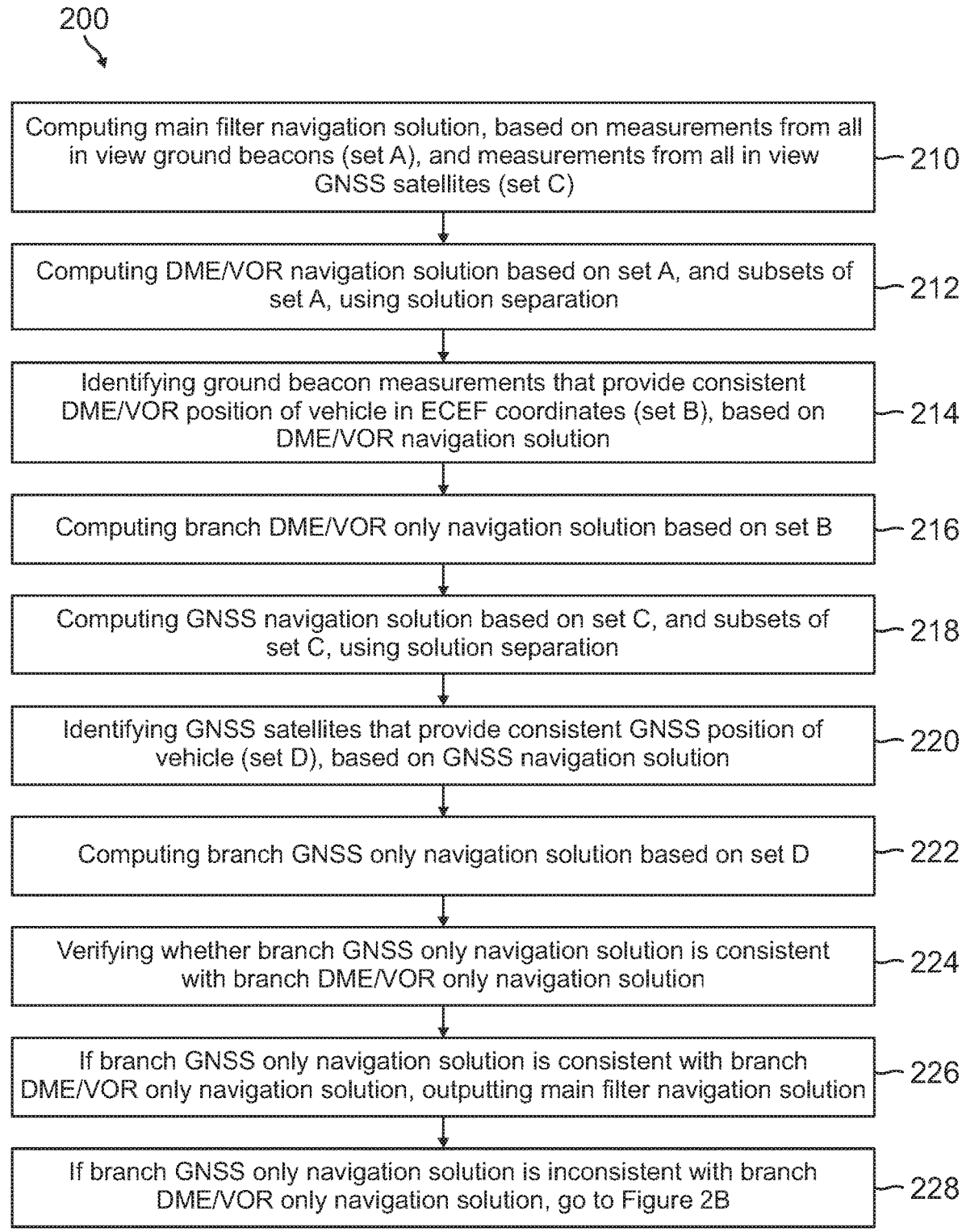
FIGS. 2A and 2B are flow diagrams of an exemplary method for assuring the integrity of DME/VOR measurements, detecting the effects of GNSS jamming and/or spoofing events, identifying the GNSS satellite measurements affected by the GNSS jamming and/or spoofing events, and assuring the integrity of the GNSS measurements unaffected by jamming and/or spoofing events, which can be implemented in the system of FIG. 1.
Figure 2B:
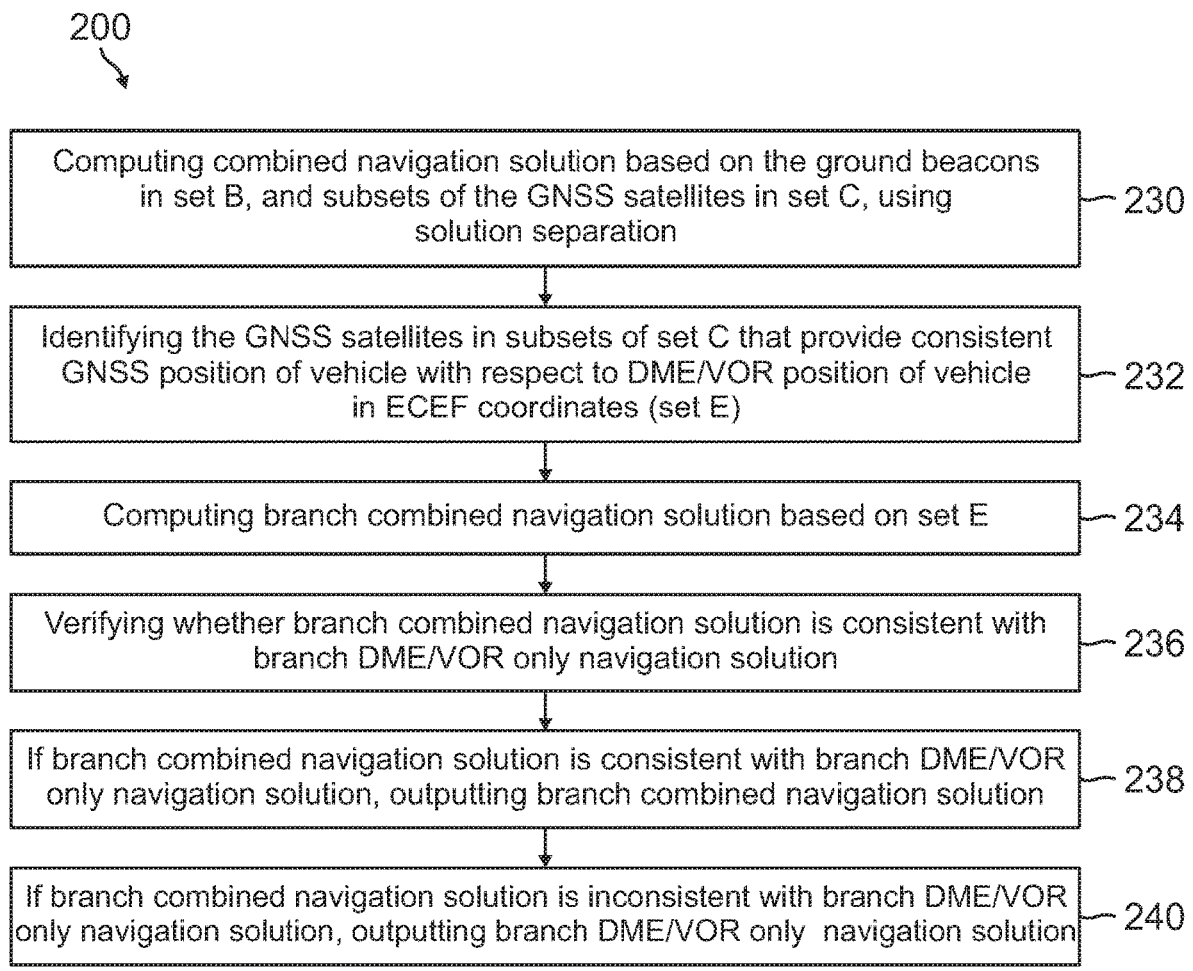

FIGS. 2A and 2B are flow diagrams of an exemplary solution separation method 200, which can be implemented in system 100. As shown in FIG. 2A, method 200 computes a main filter navigation solution, based on measurements from a set of all in view ground beacons (set A), and on measurements from a set of all in view GNSS satellites (set C) (block 210). The method 200 computes a DME/VOR navigation solution based on measurements from the ground beacons of set A, and one or more subsets of set A, using solution separation (block 212). The method 200 then identifies the ground beacon measurements that provide a consistent DME/VOR position of the vehicle in Earth-centered Earth-fixed (ECEF) coordinates (set B), based on the DME/VOR navigation solution (block 214), and computes a branch DME/VOR only navigation solution based on set B (block 216). The method 200 also computes a GNSS navigation solution based on the GNSS satellites of set C, and one or more subsets of set C, using solution separation (block 218). The method 200 then identifies the GNSS satellites that provide a consistent GNSS position of the vehicle (set D), based on the GNSS navigation solution (block 220), and computes a branch GNSS only navigation solution based on set D (block 222).

Next, method 200 verifies whether the branch GNSS only navigation solution is consistent with the branch DME/VOR only navigation solution (block 224). If the branch GNSS only navigation solution is consistent with the branch DME/VOR only navigation solution, method 200 outputs the main filter navigation solution (block 226), for use by other vehicle systems. If the branch GNSS only navigation solution is inconsistent with the branch DME/VOR only navigation solution (block 228), method 200 continues with the following steps in FIG. 2B.

As shown in FIG. 2B, method 200 computes a combined navigation solution based on the DME/VOR ground beacon measurements in set B, and one or more subsets of the GNSS satellites in set C, using solution separation (block 230). The method 200 identifies the GNSS satellites in the subsets of set C that provide a consistent GNSS position of the vehicle with respect to the DME/VOR position of the vehicle in ECEF coordinates (set E) (block 232), and computes a branch combined navigation solution based on set E (block 234). The method 200 verifies whether the branch combined navigation solution is consistent with the branch DME/VOR only navigation solution (block 236). If the branch combined navigation solution is consistent with the branch DME/VOR only navigation solution, then method 200 outputs the branch combined navigation solution (block 238), for use by other vehicle systems. If the branch combined navigation solution is inconsistent with the branch DME/VOR only navigation solution, then method 200 outputs the branch DME/VOR only navigation solution (block 240).

In the present solution separation methods, multiple filter solutions run simultaneously. The filter solutions operate with different combinations of satellites or potentially no satellites to prevent corruption from spoofed satellites. Spoofing can corrupt the time history of vehicle kinematic state solutions. Different branches of the solution separation framework require the availability of different filter statistics from different combinations of sensor measurements to compute protection levels.

Figure 3:
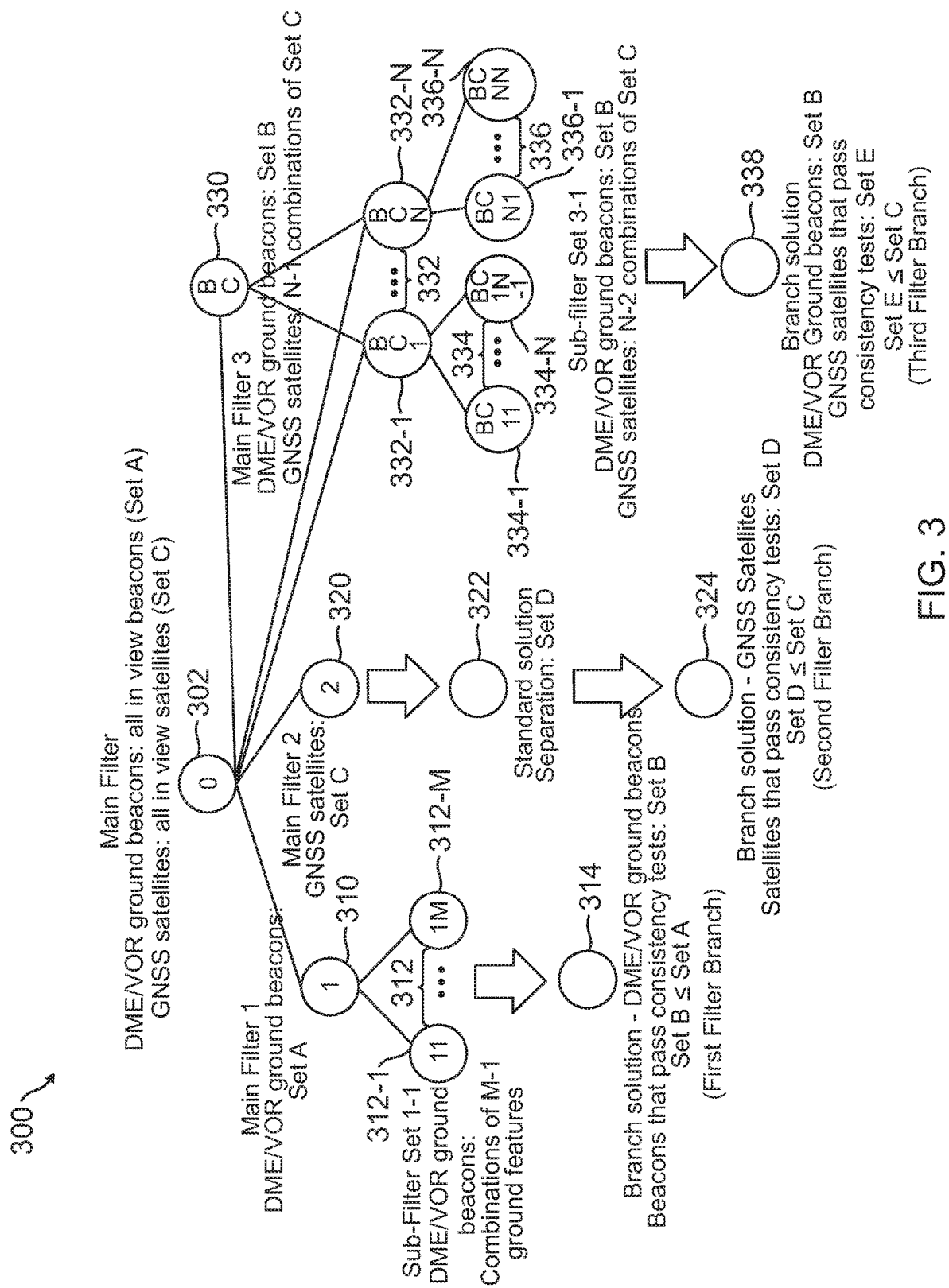
FIG. 3 is a schematic diagram of an exemplary filter arrangement for implementing a method for assuring integrity of DME/VOR measurements, detecting the effects of GNSS jamming and/or spoofing events, identifying the GNSS satellite measurements affected by the GNSS jamming and/or spoofing events, and assuring the integrity of the GNSS measurements unaffected by jamming and/or spoofing events.

FIG. 3 is a flow diagram of an exemplary filter arrangement 300 for performing the present solution separation methods. Each circle of filter arrangement 300 represents a Kalman filter (and additional filters as needed). Additionally, the main filters 302, 310, 320, and 330 represent a strapdown INS with a Kalman filter. The main filter 302 incorporates DME/VOR measurements from all in view ground beacons (set A), and GNSS pseudo-range (PR) measurements from all in view satellites (set C), to compute a main filter navigation solution. The outputs of the main filter 302 can be expressed as: $\delta X_0$, $P_0$, where $\delta X_0$ is the estimated state mean vector estimated by main filter 302, and $P_0$ is the estimated state covariance matrix estimated by main filter 302.

In a first filter branch shown in FIG. 3, the main filter 310 (circle 1) incorporates the DME/VOR measurements from set A, and its outputs can be expressed as: $\delta X_{A1}$, $P_{A1}$. A first sub-filter set 312 includes sub-filter 312-1 (circle 11) . . . sub-filter 312-M (circle 1M), and incorporates DME/VOR measurements having combinations of M−1 in view ground beacons (subsets of set A), where each sub-filter excludes a different DME/VOR measurement. The outputs of first sub-filter set 312 can be expressed as: $\delta X_{A1}$, $P_{A11}$ . . . $\delta X_{A1M}$, $P_{A1M}$. The main filter 310 and first sub-filter set 312 are operative to compute a DME/VOR navigation solution using solution separation. The DME/VOR ground beacon measurements that pass consistency tests are identified (set B), based on the DME/VOR navigation solution, and a branch DME/VOR only navigation solution 314 is selected from the main filter 310 or sub-filter set 312 based on set B. The branch DME/VOR only navigation solution 314 can be expressed as: $\delta X_B$, $P_B$. In this case, set B is less than or equal to set A.

In a second filter branch shown in FIG. 3, the main filter 320 (circle 2) incorporates the GNSS PR measurements from set C, and its outputs can be expressed as: $\delta X_C$, $P_C$. The main filter 320 and various sub-filter sets and sub-sub-filter sets are operative to compute a GNSS navigation solution using a standard solution separation method at 322. For example, a set of sub-filters can incorporate GNSS PR measurements having combinations of N−1 in view satellites (subsets of set C), where each sub-filter excludes a different GNSS PR measurement. A separation covariance propagator is used to compute statistics of the separation between the main filter and the sub-filters. The GNSS PR measurements that pass consistency tests are identified (set D), based on the GNSS navigation solution, and a branch GNSS only navigation solution 324 is selected from the main filter 320 or the sub-filter set at 322 based on set D. The branch GNSS only navigation solution 324 can be expressed as: $\delta X_D$, $P_D$. In this case, set D is less than or equal to set C.

Further details related to the standard solution separation method can be found in U.S. Pat. No. 5,760,737, entitled NAVIGATION SYSTEM WITH SOLUTION SEPARATION APPARATUS FOR DETECTING ACCURACY FAILURES, the disclosure of which is incorporated by reference herein. Additional details related to standard solution separation techniques are described, for example, in Brenner, *Integrated GPS/Inertial Fault Detection Availability*, Navigation: Journal of The Institute of Navigation, Vol. 43, No. 2, 1996, pp. 111-130; Vanderwerf, *FDE Using Multiple Integrated GPS/Inertial Kalman Filters in the Presence of Temporally and Spatially CorrelatedIonospheric Errors*, ION GPS 2001, Salt Lake City, UT, 2001, pp. 2676-2685; and Albrecht et al., *High Integrity Positioning: Lessons from the Aviation Industry*, Marine Technology Society, Dynamic Positioning Conference, 12-13 Oct. 2010, pp. 1-16. The foregoing articles by Brenner, Vanderwerf, and Ahlbrecht et al. are each incorporated by reference herein.

In a third filter branch shown in FIG. 3, the main filter 330 (circle BC) incorporates the DME/VOR measurements from set B, and the GNSS PR measurements in N−1 combinations of set C. A sub-filter set 332 includes sub-filter 332-1 (circle BC1) . . . sub-filter 332-N (circle BCN), and incorporates DME/VOR measurements from set B, and the GNSS PR measurements in N−1 combinations of set C (subsets of set C), where each sub-filter excludes a different satellite measurement. The outputs of sub-filter set 332 can be expressed as: $\delta X_{BC1}$, $E_{BC1}$, . . . $\delta X_{BCN}$, $P_{BCN}$.

A sub-sub-filter set 334 of sub-filter 332-1 includes sub-sub-filter 334-1 (circle BC11) . . . sub-sub-filter 334-N (circle BC1N-1), and incorporates DME/VOR measurements from set B, and the GNSS PR measurements in N−2 combinations of set C. The outputs of sub-sub-filter 334-1 can be expressed as: $\delta X_{BC11}$, $P_{BC11}$; and the outputs of sub-sub-filter 334-N can be expressed as $\delta X_{BC1N-1}$, $B_{BC1N-1}$.

A sub-sub-filter set 336 of sub-filter 332-N includes sub-sub-filter 336-1 (circle BCN1) . . . sub-sub-filter 336-N (circle BCNN-1), and incorporates DME/VOR measurements from set B, and the GNSS PR measurements in N−2 combinations of set C. The outputs of sub-sub-filter set 336-1 can be expressed as: $\delta X_{BCN1}$, $P_{BCN1}$; and the outputs of sub-sub-filter set 336-N can be expressed as: $\delta X_{BCNN-1}$, $B_{CNN-1}$.

The main filter 330, sub-filter set 332, and sub-sub-filter sets 334, 336 are operative to compute a combined navigation solution using solution separation. The GNSS PR measurements that pass consistency tests are identified and designated as set E. A branch combined navigation solution 338 is selected from the main filter 330, sub-filter set 332, or sub-sub-filter sets 334, 336 based on set E, and can be expressed as: $\delta X_{BE}$, $P_{BE}$. In this case, set E is less than or equal to set C.

Figure 4:
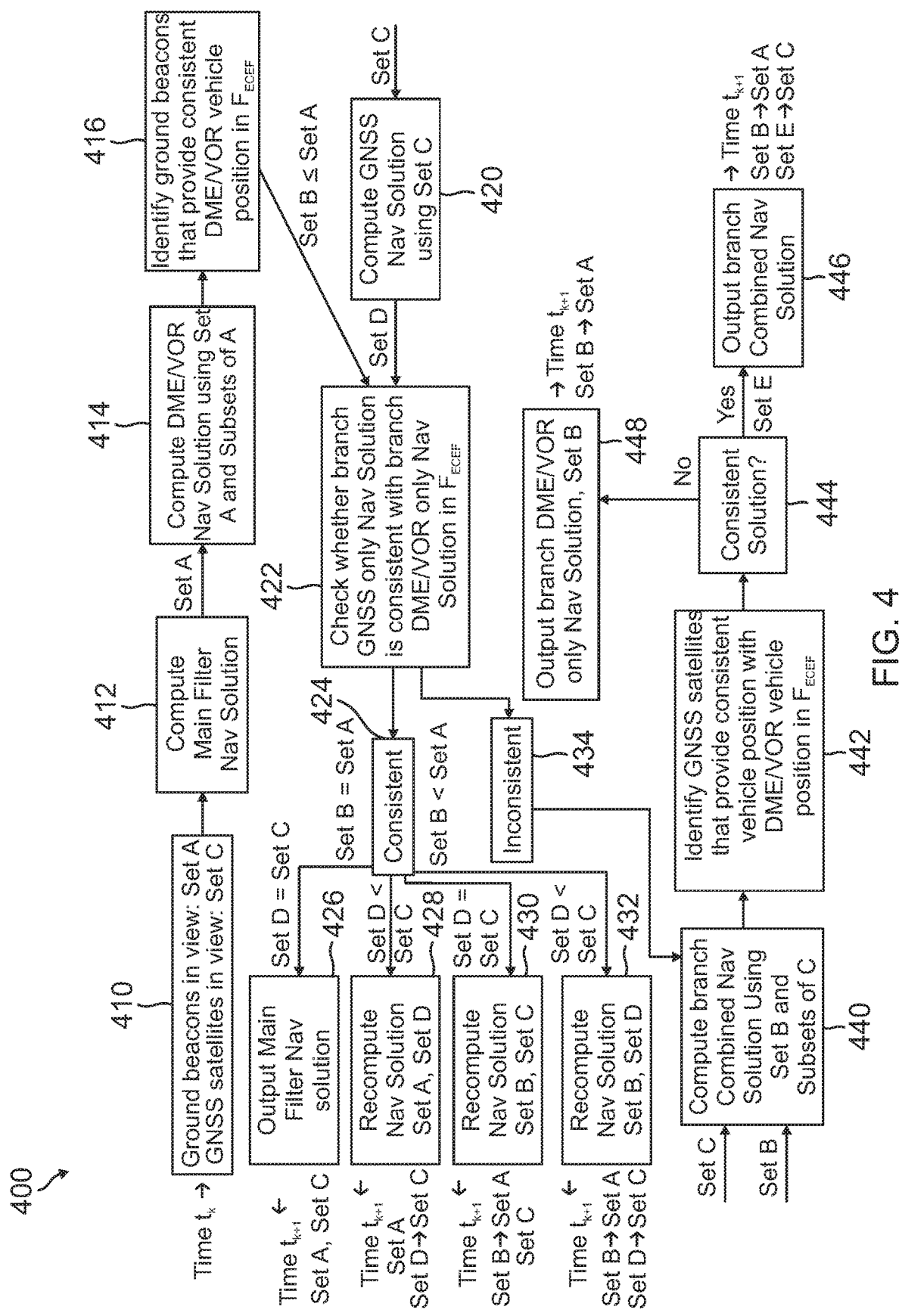
FIG. 4 is a flow diagram of a method for assuring integrity of DME/VOR measurements, detecting the effects of GNSS jamming and/or spoofing events, identifying the GNSS satellite measurements affected by the GNSS jamming and/or spoofing events, and assuring the integrity of the GNSS measurements unaffected by jamming and/or spoofing events, according to another implementation.

FIG. 4 is a flow diagram of an exemplary method 400 for assuring the integrity of DME/VOR measurements using a GNSS aided strapdown INS, detecting the effects of GNSS jamming and/or spoofing events, identifying the GNSS satellite measurements affected by the GNSS jamming and/or spoofing events, and assuring the integrity of the GNSS measurements unaffected by jamming and/or spoofing events. The method 400 comprises, at time $t_k$, obtaining DME/VOR measurements from in view ground beacons (set A), and GNSS PR measurements from in view GNSS satellites (set C) (block 410). The method 400 computes a main filter navigation solution (block 412), based on set A and set C.

The method 400 then computes a DME/VOR navigation solution using set A and subsets of set A (block 414), using solution separation. The method 400 identifies the ground features that provide a consistent DME/VOR vehicle position in ECEF coordinates ($F_{ECEF}$) (block 416), to determine a branch DME/VOR only navigation solution. The ground features that provide a consistent vehicle position are designated as set B, with set B being less than or equal to set A.

The method 400 also computes a GNSS navigation solution based on set C (block 420), using a standard solution separation technique. The method 400 identifies the GNSS satellites that provide a consistent GNSS vehicle position, with these satellites designated as set D, to determine a branch GNSS only navigation solution.

The method 400 then checks whether the branch GNSS only navigation solution is consistent with the branch DME/VOR only navigation solution in $F_{ECEF}$ (block 422). If these are consistent at 424, then there are four output options. In the first option, if set B is equal to set A and set D is equal to set C, then method 400 outputs the main filter navigation solution (block 426), and method 400 is repeated at time $t_{k+1}$ for set A and set C. In the second option, if set B is equal to set A, but set D is less than set C, then the main filter navigation solution is not usable, as at least one GNSS satellite signal is corrupted. In this case, method 400 recomputes the navigation solution using set A and set D (block 428), and method 400 is repeated at time $t_{k+1}$ for set A, and set D is set equal to set C for the next iteration. In the third option, if set B is less than set A and set D is equal to set C, then the main filter navigation solution is not usable, as at least one DME/VOR measurement is corrupted. In this case, method 400 recomputes the navigation solution using set B and set C block (430), and method 400 is repeated at time $t_{k+1}$ for set B which is set equal to set A for the next iteration, and set C. In the fourth option, if set B is less than set A and set D is less than set C, then the main filter navigation solution is not usable, as at least one DME/VOR measurement is corrupted and at least one GNSS satellite signal is corrupted. In this case, method 400 recomputes the navigation solution using set B and set D block (432), and method 400 is repeated at time $t_{k+1}$ for set B which is set equal to set A for the next iteration, and set D which is set equal to set C for the next iteration.

If the branch GNSS only navigation solution and the branch DME/VOR only navigation solution are inconsistent at 434, then method 400 computes a branch combined navigation solution using set B, and subsets of set C (block 440). The method 400 identifies the GNSS satellites in the subsets of set C that provide a consistent vehicle position with respect to the DME/VOR vehicle position in Face (block 442), and computes a branch combined navigation solution based on the GNSS PR measurements that pass this consistency test (designated as set E). The method 400 verifies whether the branch combined navigation solution and the branch DME/VOR only navigation solution provides a consistent solution (block 444). If yes, then method 400 outputs the branch combined navigation solution (block 446), and method 400 is repeated at time $t_{k+1}$ for set B which is set equal to set A, and set E which is set equal to set C. If the branch combined navigation solution and the branch DME/VOR only navigation solution do not provide a consistent solution (at block 444), then method 400 outputs the branch DME/VOR only navigation solution from set B (block 448), and method 400 is repeated at time $t_{k+1}$ for set B which is set equal to set A for the next iteration.

Further details regarding the present approach are described as follows.

Fault Detection and Exclusion—DME/VOR

A first objective of the present approach is to determine which of the ground beacon DME/VOR measurements (set A above) are consistent (designated as set B above) for the navigation solution. In making this consistency determination, the DME/VOR measurements from set A are used in conjunction with a strapdown INS solution to determine a branch DME/VOR only navigation solution. In this case, the strapdown INS solution is used without GNSS measurements, because the GNSS measurements could be corrupted and affect the identification of consistent sensor measurements from set A.

Figure 5:
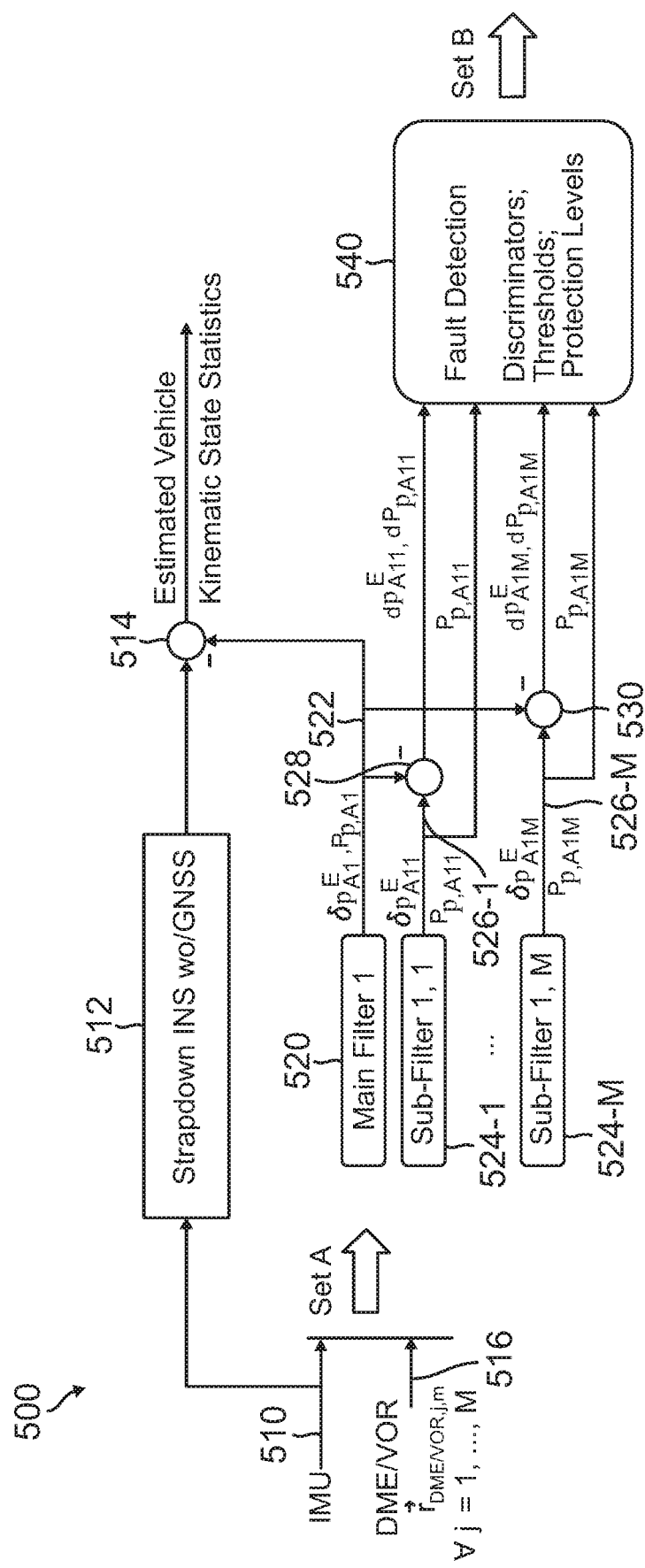
FIG. 5 is a functional block diagram of a fault detection and exclusion (FDE) DME/VOR system, according to one embodiment.

In determining the branch DME/VOR only navigation solution using the first filter branch, fault detection and exclusion (FDE) is employed for the DME/VOR measurements from set A. FIG. 5 is a functional block diagram of an FDE—DME/VOR system 500, according to an example implementation.

As shown in FIG. 5, IMU measurements 510 are sent to a strapdown INS 512 (without GNSS), which outputs estimated vehicle kinematic state statistics that are sent to a first subtractor 514. The IMU measurements 510 are combined with DME/VOR measurements 516 ($\vec{r}_{DME/VOR,j,m}$, $\forall j=1, \ldots, M$), set A, which is sent to a first main filter 520 (1) for computing a first navigation solution 522 ($\delta p_{A1}^E$, $P_{p,A1}$), which is sent to subtractor 514. A set of sub-filters of main filter 520 includes sub-filter 524-1 (1,1) . . . sub-filter 524-M (1,M). These sub-filters incorporate DME/VOR measurements having combinations of M−1 in view ground features, where each sub-filter excludes a different DME/VOR measurement to a ground beacon, using solution separation.

For example, sub-filter 524-1 computes and outputs a sub-solution 526-1 ($\delta p_{A11}^E$, $P_{p,A11}$) that is sent to a second subtractor 528, which also receives navigation solution 522. A differential ($dp_{A11}^E$, $dP_{p,A11}$) between sub-solution 526-1 and navigation solution 522 is output by subtractor 528 to a fault detection module 540. The $P_{p,A11}$ component of sub-solution 526-1 is also received by fault detection module 540. The sub-filter 524-M computes and outputs a sub-solution 526-M ($\delta p_{A1M}^E$, $P_{p,A1M}$) that is sent to a third subtractor 530, which also receives navigation solution 522. A differential ($dp_{A1M}^E$, $dP_{p,A1M}$) between the sub-solution 526-M and navigation solution 522 is output by subtractor 530 to fault detection module 540. The $P_{p,A1M}$ component of sub-solution 526-M is also received by fault detection module 540.

The fault detection module 540 employs discriminators, thresholds, and protection levels to determine which of the DME/VOR measurements are consistent, and outputs the consistent DME/VOR measurements as set B. Additional details regarding the discriminators, thresholds, and protection levels used in fault detection module 540 are described in the following sections.

FDE—DME/VOR: Discriminators and Thresholds

The discriminators (dr) used in fault detection module 540 can be expressed as:

$$dr_{A1j} = \delta r_{A1}^E - \delta r_{A1j}^E; d_{A1j} = \|dr_{A1j}\|_2.$$

A separation covariance matrix can be expressed as:

$$dP_{p,A1j} = E\left[dr_{p,A1k}^E \left(dr_{p,A1j}^E\right)^T\right] = P_{p,A1} - P_{p,A1j}^{cross} - \left(P_{p,A1j}^{cross}\right)^T + P_{p,A1j};$$

$P_{p,A1j}^{cross} \equiv$ covariance between main filter 1 and sub − filters 1, $j$.

A decision threshold (D) used in fault detection module 540 can be expressed as:

$$D_{1n,DME/VOR} \cdot D_{1n,DME/VOR} = K_{FA,DME/VOR} \sqrt{\lambda^{dP_{p,A1j}}}$$

where:

$\lambda^{dP_{p,A1j}} \equiv$ maximum eigenvalue of the separation covariance matrix;

$K_{FA,DME/VOR} \equiv$ false alert coefficient for DME/VOR;

$$K_{FA,DME/VOR} = Q^{-1}\left(\frac{P_{FA,DME/VOR}}{2M}\right); Q(x) = \int_x^\infty e^{-u^2/2} du; \text{ and}$$

$P_{FA,DME/VOR} \equiv$ probability of false alert per independent sample for DME/VOR.

There is a DME/VOR fault for beacon j if: $d_{A1j} > D_{1n,DME/VOR}$; with set B=set A−beacon j. In this case, the sub-filter j is promoted as the main filter in the first filter branch.

FDE—DME/VOR: Protection Level

The protection level (PL) used in fault detection module 540 can be expressed as:

$$PL_{1n,DME/VOR} = D_{1n,DME/VOR} + a_{1n,DME/VOR},$$

where $a_{1n,DME/VOR}$ incorporates the covariance matrix of the sub-filter and the probability of missed detection, $P_{MD,DME/VOR}$. The uncertainty effect of the sub-filter can be expressed as:

$$a_{1n,DME/VOR} = K_{MD,DME/VOR} \sqrt{\lambda^{P_{p,A1j}}},$$

where $\lambda^{P_{p,A1j}} \equiv$ maximum eigenvalue of the sub-filter covariance matrix; and $K_{MD,DME/VOR}$ missed detection coefficient for DME/VOR.

The probability of missed detection, $P_{MD,DME/VOR}$ is derived from the probability of hazardous misleading information for the navigation system, $P_{HMI}$. The probability of missed detection is equally allocated among all sub-filters/sub-solutions. The missed detection coefficient for DME/VOR ($K_{MD,DME/VOR}$) can be expressed as:

$$K_{MD,DME/VOR} = Q^{-1}(P_{MD,DME/VOR}).$$

Fault Detection and Exclusion—GNSS

A second objective of the present approach is to determine which of the GNSS PR measurements (set C above) are consistent (designated as set D above) for the navigation solution. In making this consistency determination, the GNSS PR measurements from set C are used in conjunction with a strapdown INS solution to determine a branch GNSS only navigation solution using a standard solution separation technique with sub-filters and sub-sub-filters. Such standard solution separation techniques are described, for example, in Brenner, *Integrated GPS/Inertial Fault Detection Availability*, Navigation: Journal of The Institute of Navigation, Vol. 43, No. 2, 1996, pp. 111-130; Vanderwerf, *FDE Using Multiple Integrated GPS/Inertial Kalman Filters in the Presence of Temporally and Spatially Correlated Ionospheric Errors*, ION GPS 2001, Salt Lake City, U T, 2001, pp. 2676-2685; and Albrecht et al., *High Integrity Positioning: Lessons from the Aviation Industry*, Marine Technology Society, Dynamic Positioning Conference, 12-13 Oct. 2010, pp. 1-16.

Figure 6:
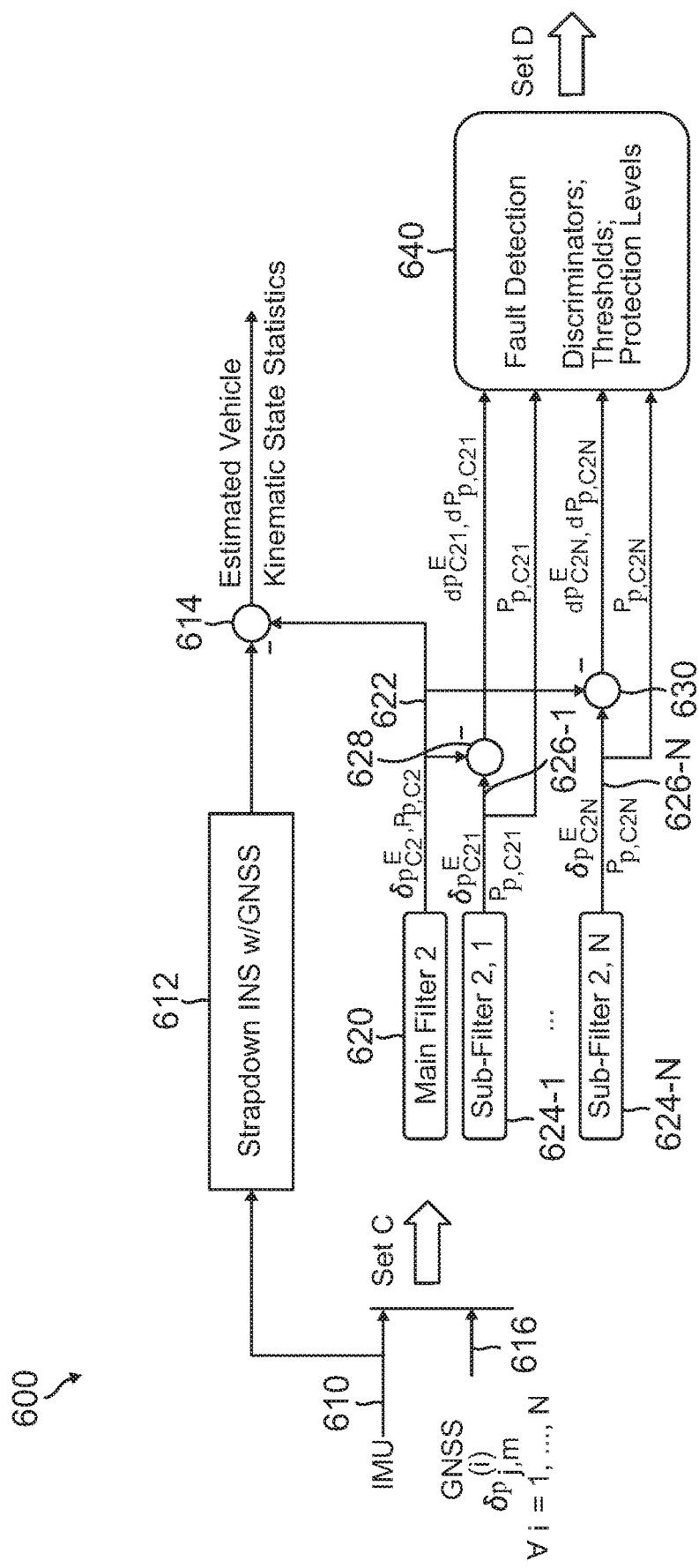
FIG. 6 is a functional block diagram of an FDE—GNSS system, according to another embodiment.

In determining the branch GNSS only navigation solution using the second filter branch, FDE is employed for the GNSS PR measurements from set C. FIG. 6 is a functional block diagram of an FDE—GNSS system 600, according to an example implementation.

As shown in FIG. 6, IMU measurements 610 are sent to strapdown INS 612 (with GNSS), which outputs estimated vehicle kinematic state statistics that are sent to a first subtractor 614. The IMU measurements are combined with GNSS PR measurements 616 ($\delta \rho_{j,m}^{(i)}$, $\forall i=1, \ldots, N$) where N is the number of in-view satellites, to produce set C that is sent to a second main filter 620 (2) for computing a second navigation solution 622 ($\delta p_{C2}^E$, $P_{p,C2}$), which is sent to subtractor 614. A set of sub-filters of second main filter 620 includes sub-filter 624-1 (2,1) . . . sub-filter 624-N (2,N). These sub-filters incorporate GNSS PR measurements having combinations of N−1 in view satellites, where each sub-filter excludes a different GNSS PR measurement, using solution separation.

For example, sub-filter 624-1 computes and outputs a navigation sub-solution 626-1 ($\delta p_{C21}^E$, $P_{p,C21}$) that is sent to a second subtractor 628, which also receives navigation solution 622 from second main filter 620. A differential ($dp_{C21}^E$, $dP_{p,C21}$) between sub-solution 626-1 and navigation solution 622 is output by subtractor 628 to a fault detection module 640. The $P_{p,C21}$ component of sub-solution 626-1 is also received by fault detection module 640. The sub-filter 624-N computes and outputs a sub-solution 626-N ($\delta P_{C2N}^E$, $P_{p,C2N}$) that is sent to a third subtractor 630, which also receives navigation solution 622. A differential ($dp_{C2N}^E$, $dP_{p,C2N}$) between sub-solution 626-N and navigation solution 622 is output by subtractor 630 to fault detection module 640. The $P_{p,C2N}$ component of sub-solution 626-N is also received by fault detection module 640.

The fault detection module 640 employs discriminators, thresholds, and protection levels to determine which of the GNSS PR measurements from set C are consistent for the navigation solution, and outputs the consistent GNSS PR measurements as set D. Additional details regarding the discriminators, thresholds, and protection levels used in fault detection module 640 are described in the following sections.

FDE—GNSS: Discriminators and Thresholds

The discriminators and thresholds used in fault detection module 640 are computed based on standard solution separation techniques. Such standard solution separation techniques are described, for example, in Brenner, *Integrated GPS/Inertial Fault Detection Availability, Navigation: Journal of The Institute of Navigation*, Vol. 43, No. 2, 1996, pp. 111-130; Vanderwerf, *FDE Using Multiple Integrated GPS/Inertial Kalman Filters in the Presence of Temporally and Spatially Correlated Ionospheric Errors*, ION GPS 2001, Salt Lake City, UT, 2001, pp. 2676-2685; and Albrecht et al., *High Integrity Positioning: Lessons from the Aviation Industry*, Marine Technology Society, Dynamic Positioning Conference, 12-13 Oct. 2010, pp. 1-16.

FDE—DME/VOR/GNSS: Discriminators and Thresholds—Branches 1 and 2

The discriminators and thresholds used to determine the consistency (block 422, FIG. 4) between the first and second filter branches (FIG. 3) are computed based on the outputs of fault detection module 540 (FIG. 5) and fault detection module 640 (FIG. 6). The discriminators can be expressed as:

$$dr_{BD} = \delta r_B^E - \delta r_D^E; d_{BD} = \|\delta r_B^E - \delta r_D^E\|_2.$$

A separation covariance matrix can be expressed as:

$$dP_{p,BD} = E[dr_{BD}(dr_{BD})^T] = P_{p,B} - P_{p,BD}^{cross} - (P_{p,BD}^{cross})^T + P_{p,D};$$

$P_{p,BD}^{cross}$ ≡ covariance between DME/VOR only and GNSS only solution=0.

A decision threshold can be expressed as:

$$D_{DME/VOR,GNSS}:D_{DME/VOR,GNSS} = K_{FA,DME/VOR,GNSS}\sqrt{\lambda^{dP_{p,BD}}},$$

where:

$\lambda^{dP_{p,BD}}$ ≡ maximum eigenvalue of the separation covariance matrix;

-continued $K_{FA,DME/VOR,GNSS}$ ≡ false alert coefficient for *DME/VOR* and *GNSS*;

$$K_{FA,DME/VOR,GNSS} = Q^{-1}\left(\frac{P_{FA,DME/VOR,GNSS}}{2}\right); \text{and}$$

$P_{FA,DME/VOR,GNSS}$ ≡ probability of false alert per independent sample for *DME/VOR* and *GNSS*.

The GNSS only solution is unusable (inconsistent) if: $d_{BD} > D_{DME/VOR,GNSS}$. The GNSS only solution is usable (consistent) if: $d_{BD} \leq D_{DME/VOR,GNSS}$.

FDE—DME/VOR/GNSS: Protection Level

When the GNSS only solution is determined to be usable (consistent), there are four output options, since both the first and second filter branches have confirmed sensor sets (B and D). In the first output option, if set A=set B and set C=set D, then the navigation filter structure remains the same. The protection level is computed using a main filter 0 (e.g., main filter 302, FIG. 3), a main filter 1 (e.g., first main filter 520, FIG. 5) and a main filter 2 (e.g., second main filter 620, FIG. 6).

In the second output option, if set A=set B and set C>set D, then the main filter 0 is not usable, as at least one GNSS satellite signal is corrupted. In this case, a sub-filter BC (e.g., main filter 330, FIG. 3), is promoted to be the main filter. The third filter branch is used to determine a usable navigation solution, and the protection level is computed within the third filter branch.

In the third output option, if set A>set B and set C=set D, then the main filter 0 is not usable, as at least one DME/VOR measurement is corrupted. In this case, a sub-filter BC is promoted to be the main filter. The protection level is computed using the new main filter (BC) and a sub-filter BCi (e.g., sub-filter 332-1, FIG. 3).

In the fourth output option, if set A>set B and set C>set D, then the main filter 0 is not usable, as at least one GNSS satellite signal is corrupted and at least one DME/VOR measurement is corrupted. In this case, the sub-filter BC is promoted to be the main filter. The third filter branch is employed to determine a usable navigation solution, and the protection level is computed within the third filter branch.

When the GNSS only solution has been determined to be not useable (inconsistent), the main filter 0 is not usable. In this case, the sub-filter BC is promoted to be the main filter. The third filter branch is employed to determine a usable navigation solution, and the protection level is computed within the third filter branch.

For example, when set A=set B and set C=set D, the protection level can be expressed as:

$$PL_{01} = \min(D_{01,DME/VOR}, D_{02,GNSS}) + \min(a_{01,DME/VOR}, a_{02,GNSS});$$

$$dr_{0A1} = \delta r_0^E - \delta r_{A1}^E;$$

$$dP_{p,0A1} = E[dr_{0A1}(dr_{0A1})^T] = P_{p,0} - P_{p,0A1}^{cross} - (P_{p,0A1}^{cross})^T + P_{p,A1};$$

$P_{p,0A1}^{cross}$ ≡ covariance between main filter and sub (main)—filter 1.

It is noted that there are other ways of computing the protection level. For example, the protection level can be computed using the minimum of each branch separately: $PL_{01} = \min(D_{01,DME/VOR} + a_{01,DME/VOR}) + \min(D_{02,GNSS} + a_{02,GNSS})$. The exact form of the protection level is a user design decision. The decision threshold for the DME/VOR measurements can be expressed as:

$$D_{0A1,DME/VOR}:D_{0A1,DME/VOR} = K_{FA,DME/VOR}\sqrt{\lambda^{dP_{p,0A1}}}$$

where:
$\lambda^{dP_{p,0A1}}$ ≡maximum eigenvalue of the separation covariance matrix;
$K_{FA,DME/VOR}$ ≡false alert coefficient for DME/VOR;
$P_{FA,DME/VOR}$ ≡probability of false alert per independent sample for DME/VOR;

$$dr_{OB1} = \delta r_0^E - \delta r_{B1}^E;$$

$$dP_{p,OB1} = E[dr_{OB1}(dr_{OB1})^T] = P_{p,0} - P_{p,OB1}{}^{cross} - (P_{p,OB1}{}^{cross})^T + P_{p,B1};$$

$P_{p,OB1}{}^{cross}$ ≡covariance between main filter and sub (main)—filter 2.

The decision threshold for the GNSS measurements can be expressed as:

$$D_{02,GNSS}: D_{02,GNSS} = K_{FA,GNSS}\sqrt{\lambda^{dP_{p,OB1}}}$$

where:
$\lambda^{dP_{p,OB1}}$ ≡maximum eigenvalue of the separation covariance matrix;
$K_{FA,GNSS}$ ≡false alert coeffiencient for GNSS;
$P_{FA,GNSS}$ ≡probability of false alert per independent sample for GNSS;

The uncertainty effects of the DME/VOR and GNSS branches can be expressed as:

$$a_{01,DME/VOR} = K_{MD,DME/VOR}\sqrt{\lambda^{P_{p,A1}}}$$

$$a_{02,GNSS} = K_{MD,GNSS}\sqrt{\lambda^{P_{p,B2}}}$$

where:
$\lambda^{P_{p,A1}}$ ≡maximum eigenvalue of the sub-filter covariance matrix;
$K_{MD,DME/VOR}$ ≡missed detection coeffiencient for DME/VOR;
$\lambda^{P_{p,B2}}$ ≡maximum eigenvalue of the sub-filter covariance matrix;
$K_{MD,GNSS}$ ≡missed detection coeffiencient for GNSS.

The missed detection coefficient for DME/VOR can be expressed as: $K_{MD,DME/VOR} = Q^{-1}(P_{MD,DME/VOR})$. The missed detection coefficient (GNSS) can be expressed as: $K_{MD,GNSS} \equiv Q^{-1}(P_{MD,GNSS})$.

Fault Detection and Exclusion—DME/VOR and GNSS

Figure 7:
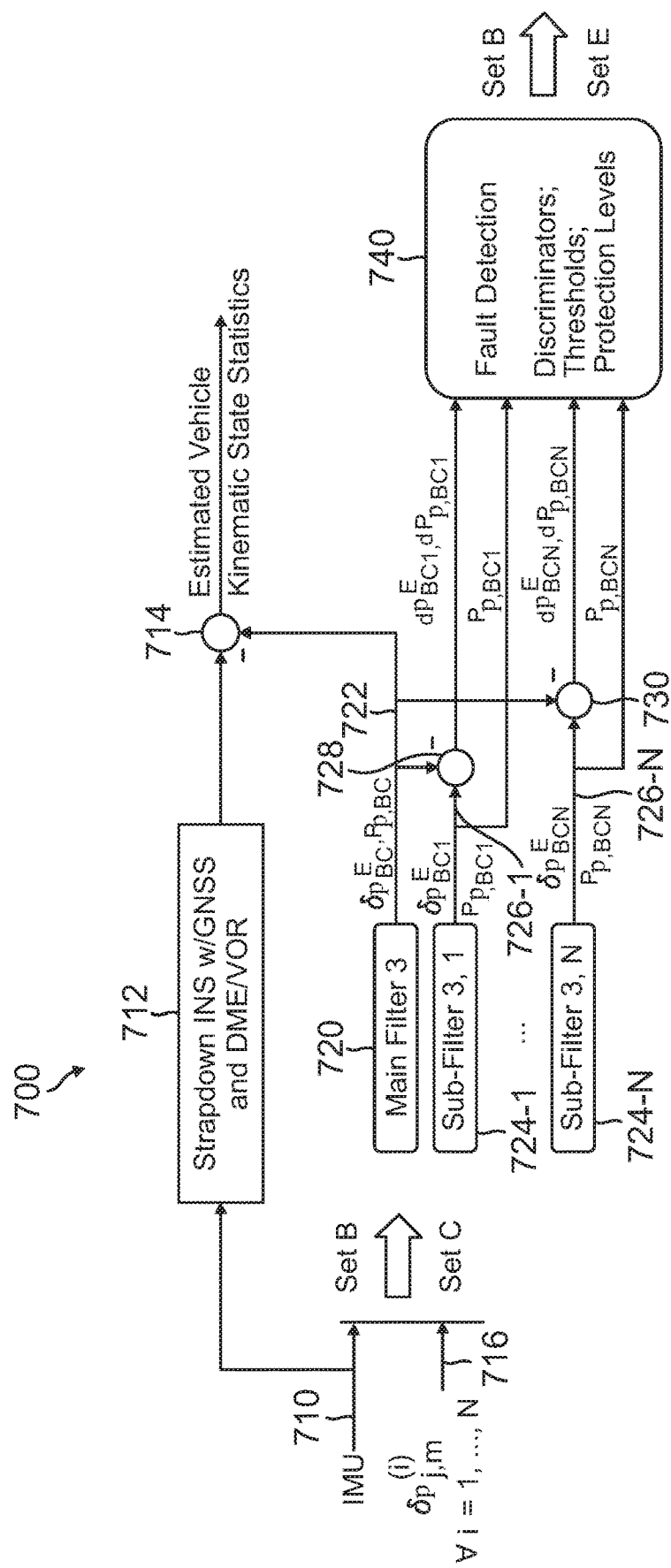
FIG. 7 is a functional block diagram of an FDE—DME/VOR/GNSS system, according to a further embodiment.

In determining the combined navigation solution using the third filter branch, FDE is employed with the strapdown INS solution using the sensor measurements of set B and set C, to determine which of the sensor measurements of set B and set C are consistent for the navigation solution. FIG. 7 is a functional block diagram of an FDE—DME/VOR/GNSS system 700, according to an example implementation.

As shown in FIG. 7, when set A≥set B and/or set C≥set D, IMU measurements 710 are sent to strapdown INS 712 (with GNSS and DME/VOR), which outputs estimated vehicle kinematic state statistics that are sent to a first subtractor 714. The DME/VOR measurements using set B are combined with GNSS PR measurements 716 ($\delta\rho_{j,m}^{(i)}$, $\forall i=1, \ldots, N$), such that set B and set C are sent to a third main filter 720 (3) for computing a third navigation solution 722 ($\delta p_{BC}^E$, $P_{p,BC}$), which is sent to subtractor 714. A set of sub-filters of third main filter 720 includes sub-filter 724-1 (3,1) ... sub-filter 724-N (3,N). These sub-filters incorporate sensor measurements of set B and set C having combinations of N−1 in view satellites, where each sub-filter excludes a different GNSS PR measurement from set C, using solution separation.

For example, sub-filter 724-1 computes and outputs a navigation sub-solution 726-1 ($\delta p_{BC1}^E$, $P_{p,BC1}$) that is sent to a second subtractor 728, which also receives navigation solution 722 from third main filter 720. A differential ($dp_{BC1}^E$, $dP_{p,BC1}$) between the sub-solution 726-1 and navigation solution 722 is output by subtractor 728 to a fault detection module 740. The $P_{p,BC1}$ component of sub-solution 726-1 is also received by fault detection module 740. The sub-filter 724-N computes and outputs a navigation sub-solution 726-N ($\delta p_{BCN}^E$, $P_{p,BCN}$) that is sent to a third subtractor 730, which also receives navigation solution 722. A differential ($dp_{BCN}^E$, $dP_{p,BCN}$) between sub-solution 726-N and navigation solution 722 is output by subtractor 730 to fault detection module 740. The $P_{p,BCN}$ component of sub-solution 726-N is also received by fault detection module 740.

The fault detection module 740 employs discriminators, thresholds, and protection levels to determine which of the sensor measurements of set B and set C are consistent for the navigation solution, and outputs set B or set E. Additional details regarding the discriminators, thresholds, and protection levels used in fault detection module 740 are described in the following sections.

FDE—DME/VOR/GNSS: Discriminators and Thresholds

The discriminators used in fault detection module 740 can be expressed as:

$$dr_{BCi} \equiv \delta r_{BC}^E - \delta r_{BCi}^E; d_{BCi} = \|dr_{BCi}\|^2.$$

The separation covariance matrix can be expressed as:

$$dP_{p,BCi} = E[dr_{p,BCi}^E(dr_{p,BCi}^E)^T] = P_{p,BC} - P_{p,BCi}{}^{cross} - (P_{p,BCi}{}^{cross})^T + P_{p,BCi};$$

$P_{p,BCi}{}^{cross}$ ≡covariance between main filter 3 and sub-filters 3, i.

The decision threshold can be expressed as:

$$D_{3n,DME/VOR,GNSS}: D_{3n,DME/VOR,GNSS} = K_{FA,DME/VOR,GNSS}\sqrt{\lambda^{dP_{p,BCi}}}$$

where:
$\lambda^{dP_{p,BCi}}$ ≡maximum eigenvalue of the separation covariance matrix;
$K_{FA,DME/VOR,GNSS}$ ≡false alert coeffiencient for DME/VOR and GNSS;

$$K_{FA,DME/VOR,GNSS} = Q^{-1}\left(\frac{P_{FA,DME/VOR,GNSS}}{2N}\right);$$

$P_{FA,DME/VOR,GNS}$ ≡probability of false alert per independent sample for DME/VOR and GNSS.

There is a GNSS fault for a satellite i if: $d_{BCi} > D_{3n,DME/VOR,GNSS}$, with set D=set C−satellite i. In this case, the sub-filter i is promoted as the main filter in the third filter branch.

FDE—DME/VOR/GNSS: Protection Level

The protection level used in fault detection module 740 (FIG. 7) can be expressed as:

$$PL_{3n,DME/VOR,GNSS} = D_{3n,DME/VOR,GNSS} + a_{3n,DME/VOR,GNSS}.$$

The uncertainty term $a_{3n,DME/VOR,GNSS}$ incorporates the covariance matrix of the sub-filter and the probability of missed detection, $P_{MD,DME/VOR,GNSS}$. The uncertainty effect of the sub-filter can be expressed as:

$$a_{3n,DME/VOR,GNSS} = K_{MD,DME/VOR,GNSS}\sqrt{\lambda^{P_{p,BCi}}}$$

where:

$\lambda^{P_p,BCi}$ = maximum eigenvalue of the sub-filter covariance matrix;

$K_{MD,DME/VOR,GNSS}$ missed detection coeffiencient for DME/VOR and GNSS.

The probability of missed detection, $P_{MD,DME/VOR,GNSS}$ is derived from the probability of hazardous misleading information for the navigation system, $P_{HMI}$ (integrity requirement), and is equally allocated among all sub-filters/sub-solutions. The missed detection coefficient, $K_{MD,DME/VOR,GNSS}$, can be expressed as:

$$K_{MD,DME/VOR,GNSS} = Q^{-1}(P_{MD,DME/VOR,GNSS}).$$

The processing units and/or other computational devices used in systems and methods described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a method comprising: computing a main filter navigation solution for a vehicle, based on a set of DME measurements and/or VOR measurements from one or more in view ground beacons (set A), and on a set of GNSS measurements from one or more in view GNSS satellites (set C); computing a DME/VOR navigation solution based on set A, and one or more subsets of set A, using solution separation; identifying the DME/VOR measurements in set A that provide a consistent DME/VOR position of the vehicle (set B), based on the DME/VOR navigation solution; computing a branch DME/VOR only navigation solution based on the DME/VOR measurements in set B; computing a GNSS navigation solution based on set C, and one or more subsets of set C, using solution separation; identifying the GNSS measurements in set C that provide a consistent GNSS position of the vehicle (set D), based on the GNSS navigation solution; computing a branch GNSS only navigation solution based on the GNSS measurements in set D; and verifying whether the branch GNSS only navigation solution is consistent with the branch DME/VOR only navigation solution; if the branch GNSS only navigation solution is consistent with the branch DME/VOR only navigation solution, then outputting the main filter navigation solution; if the branch GNSS only navigation solution is inconsistent with the branch DME/VOR only navigation solution, then the method further comprises: computing a combined navigation solution using the DME/VOR measurements in set B, and one or more subsets of the GNSS measurements in set C, using solution separation; identifying the GNSS measurements in the one or more subsets of set C that provide a consistent GNSS position of the vehicle (set E), with respect to the DME/VOR position of the vehicle; computing a branch combined navigation solution based on set E; and verifying whether the branch combined navigation solution is consistent with the branch DME/VOR only navigation solution; if the branch combined navigation solution is consistent with the branch DME/VOR only navigation solution, then outputting the branch combined navigation solution; if the branch combined navigation solution is inconsistent with the branch DME/VOR only navigation solution, then outputting the branch DME/VOR only navigation solution.

Example 2 includes the method of Example 1, wherein: the set of DME/VOR measurements are received by a DME/VOR receiver onboard the vehicle; and the set of GNSS measurements are received by a GNSS receiver onboard the vehicle; wherein the DME/VOR receiver and the GNSS receiver are selectively coupled to an onboard navigation filter that operatively communicates with an onboard integrity checks module; wherein the navigation filter includes a main filter, a first filter branch of the main filter, a second filter branch of the main filter, and a third filter branch of the main filter.

Example 3 includes the method of Example 2, wherein the main filter incorporates the DME/VOR measurements from all in view ground beacons, and the GNSS measurements from all in view GNSS satellites, to compute the main filter navigation solution.

Example 4 includes the method of any of Examples 2-3, wherein the first filter branch includes a first main filter that incorporates the DME/VOR measurements from set A, and a first sub-filter set that includes one or more sub-filters that incorporate the DME/VOR measurements in one or more subsets of set A, where each sub-filter excludes a different DME/VOR measurement.

Example 5 includes the method of Example 4, wherein the first main filter and the first sub-filter set are operative to compute the DME/VOR navigation solution based on set A, and the one or more subsets of set A, using solution separation.

Example 6 includes the method of any of Examples 3-5, wherein the second filter branch includes a second main filter that incorporates the GNSS measurements from set C, and a second sub-filter set that includes one or more sub-filters that incorporate the GNSS measurements in one or more subsets of set C, where each sub-filter excludes a different GNSS measurement.

Example 7 includes the method of Example 6, wherein the second main filter and the second sub-filter set are operative to compute the GNSS navigation solution based on set C, and the one or more subsets of set C, using solution separation.

Example 8 includes the method of any of Examples 3-7, wherein the third filter branch includes a third main filter that incorporates the DME/VOR measurements from set B and one or more subsets of the GNSS measurements in set C, and a third sub-filter set that includes one or more sub-filters that incorporate the DME/VOR measurements from set B and the GNSS measurements in one or more subsets of set C, where each sub-filter excludes a different GNSS measurement.

Example 9 includes the method of Example 8, wherein the third main filter and the third sub-filter set are operative to compute the combined navigation solution based on set B, and the one or more subsets of set C, using solution separation.

Example 10 includes the method of any of Examples 2-9, wherein the integrity checks module performs a process comprising: performing a first FDE using the first filter branch to determine which of the DME/VOR measurements in set A are consistent; and outputting the consistent DME/VOR measurements as set B; wherein the first FDE employs discriminators, thresholds, and protection levels to determine which of the DME/VOR measurements in set A are consistent.

Example 11 includes the method of Example 10, wherein the integrity checks module performs a process comprising: performing a second FDE using the second filter branch to determine which of the GNSS measurements in set C are consistent; and outputting the consistent GNSS measurements as set D; wherein the second FDE employs discriminators, thresholds, and protection levels to determine which of the GNSS measurements in set C are consistent.

Example 12 includes the method of Example 11, wherein the integrity checks module performs a process comprising: performing a third FDE using the third filter branch to determine which of the GNSS measurements in set C are consistent with the DME/VOR measurements in set B; and outputting the consistent GNSS measurements as set E; wherein the third FDE employs discriminators, thresholds, and protection levels to determine which of the GNSS measurements in set C are consistent.

Example 13 includes the method of any of Examples 1-12, wherein the vehicle is a UAS vehicle, or a UAM vehicle.

Example 14 includes a system, comprising: at least one processor onboard a vehicle; a navigation filter hosted by the at least one processor, the navigation filter including a main filter, a first filter branch of the main filter, a second filter branch of the main filter, and a third filter branch of the main filter; an integrity checks module hosted by the at least one processor, the integrity checks module in operative communication with the navigation filter; an IMU onboard the vehicle, the IMU operative to produce inertial measurements for the vehicle; a strapdown INS onboard the vehicle, the strapdown INS in operative communication with the navigation filter and the IMU, the strapdown INS operative to produce estimated vehicle kinematic state statistics based on the inertial measurements from the IMU; a DME and/or VOR receiver onboard the vehicle and selectively coupled to the navigation filter, the DME/VOR receiver operative to receive a set of DME/VOR measurements from in view ground beacons (set A); and a GNSS receiver onboard the vehicle and selectively coupled to the navigation filter, the GNSS receiver operative to receive a set of GNSS measurements from in view GNSS satellites (set C); wherein the navigation filter is configured to receive the estimated vehicle kinematic state statistics from the strapdown INS; wherein the navigation filter and the integrity checks module are configured to operate together to assure integrity of the DME/VOR measurements by a process that comprises: compute a main filter navigation solution for the vehicle, based on the DME/VOR measurements in set A, and the GNSS measurements in set C; compute a DME/VOR navigation solution based on set A, and one or more subsets of set A, using solution separation; identify the DME/VOR measurements in set A that provide a consistent DME/VOR position of the vehicle (set B), based on the DME/VOR navigation solution; compute a branch DME/VOR only navigation solution based on the DME/VOR measurements in set B; compute a GNSS navigation solution based on set C, and one or more subsets of set C, using solution separation; identify the GNSS measurements in set C that provide a consistent GNSS position of the vehicle (set D), based on the GNSS navigation solution; compute a branch GNSS only navigation solution based on the GNSS measurements in set D; and verify whether the branch GNSS only navigation solution is consistent with the branch DME/VOR only navigation solution; if the branch GNSS only navigation solution is consistent with the branch DME/VOR only navigation solution, then output the main filter navigation solution; if the branch GNSS only navigation solution is inconsistent with the branch DME/VOR only navigation solution, then the process further comprises: compute a combined navigation solution using the DME/VOR measurements in set B, and one or more subsets of the GNSS measurements in set C, using solution separation; identify the GNSS measurements in the one or more subsets of set C that provide a consistent GNSS position of the vehicle (set E), with respect to the DME/VOR position of the vehicle; compute a branch combined navigation solution based on set E; and verify whether the branch combined navigation solution is consistent with the branch DME/VOR only navigation solution; if the branch combined navigation solution is consistent with the branch DME/VOR only navigation solution, then output the branch combined navigation solution; if the branch combined navigation solution is inconsistent with the branch DME/VOR only navigation solution, then output the branch DME/VOR only navigation solution.

Example 15 includes the system of Example 14, wherein the first filter branch includes a first main filter that incorporates the DME/VOR measurements from set A, and a first sub-filter set that includes one or more sub-filters that incorporate the DME/VOR measurements in one or more subsets of set A, where each sub-filter excludes a different DME/VOR measurement; wherein the first main filter and the first sub-filter set are operative to compute the DME/VOR navigation solution based on set A, and the one or more subsets of set A, using solution separation.

Example 16 includes the system of Example 15, wherein the second filter branch includes a second main filter that incorporates the GNSS measurements from set C, and a second sub-filter set that includes one or more sub-filters that incorporate the GNSS measurements in one or more subsets of set C, where each sub-filter excludes a different GNSS measurement; wherein the second main filter and the second sub-filter set are operative to compute the GNSS navigation solution based on set C, and the one or more subsets of set C, using solution separation.

Example 17 includes the system of Example 16, wherein the third filter branch includes a third main filter that incorporates the DME/VOR measurements from set B and one or more subsets of the GNSS measurements in set C, and a third sub-filter set that includes one or more sub-filters that incorporate the DME/VOR measurements from set B and the GNSS measurements in one or more subsets of set C, where each sub-filter excludes a different GNSS measurement; wherein the third main filter and the third sub-filter set are operative to compute the combined navigation solution based on set B, and the one or more subsets of set C, using solution separation.

Example 18 includes the system of any of Examples 14-17, wherein the integrity checks module is operative to: perform a first FDE in conjunction with the first filter branch to determine which of the DME/VOR measurements in set A are consistent; and output the consistent DME/VOR measurements as set B; wherein the first FDE employs discriminators, thresholds, and protection levels to determine which of the DME/VOR measurements in set A are consistent.

Example 19 includes the system of Example 18, wherein the integrity checks module is operative to: perform a second FDE in conjunction with the second filter branch to determine which of the GNSS measurements in set C are consistent; and output the consistent GNSS measurements as set D; wherein the second FDE employs discriminators, thresholds, and protection levels to determine which of the GNSS measurements in set C are consistent.

Example 20 includes the system of Example 19, wherein the integrity checks module is operative to: perform a third FDE in conjunction with the third filter branch to determine which of the GNSS measurements in set C are consistent with the DME/VOR measurements in set B; and output the consistent GNSS measurements as set E; wherein the third FDE employs discriminators, thresholds, and protection levels to determine which of the GNSS measurements in set C are consistent.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:
    computing a main filter navigation solution for a vehicle, based on a set of distance measuring equipment (DME) measurements and/or very high frequency (VHF) omni-directional range (VOR) measurements from one or more in view ground beacons (set A), and on a set of global navigation satellite system (GNSS) measurements from one or more in view GNSS satellites (set C);
    computing a DME/VOR navigation solution based on set A, and one or more subsets of set A, using solution separation;
    identifying the DME/VOR measurements in set A that provide a consistent DME/VOR position of the vehicle (set B), based on the DME/VOR navigation solution;
    computing a branch DME/VOR only navigation solution based on the DME/VOR measurements in set B;
    computing a GNSS navigation solution based on set C, and one or more subsets of set C, using solution separation;
    identifying the GNSS measurements in set C that provide a consistent GNSS position of the vehicle (set D), based on the GNSS navigation solution;
    computing a branch GNSS only navigation solution based on the GNSS measurements in set D; and
    verifying whether the branch GNSS only navigation solution is consistent with the branch DME/VOR only navigation solution;
    if the branch GNSS only navigation solution is consistent with the branch DME/VOR only navigation solution, then outputting the main filter navigation solution;
    if the branch GNSS only navigation solution is inconsistent with the branch DME/VOR only navigation solution, then the method further comprises:
        computing a combined navigation solution using the DME/VOR measurements in set B, and one or more subsets of the GNSS measurements in set C, using solution separation;
        identifying the GNSS measurements in the one or more subsets of set C that provide a consistent GNSS position of the vehicle (set E), with respect to the DME/VOR position of the vehicle;
        computing a branch combined navigation solution based on set E; and
        verifying whether the branch combined navigation solution is consistent with the branch DME/VOR only navigation solution;
        if the branch combined navigation solution is consistent with the branch DME/VOR only navigation solution, then outputting the branch combined navigation solution;
        if the branch combined navigation solution is inconsistent with the branch DME/VOR only navigation solution, then outputting the branch DME/VOR only navigation solution.

2. The method of claim 1, wherein:
    the set of DME/VOR measurements are received by a DME/VOR receiver onboard the vehicle; and
    the set of GNSS measurements are received by a GNSS receiver onboard the vehicle;
    wherein the DME/VOR receiver and the GNSS receiver are selectively coupled to an onboard navigation filter that operatively communicates with an onboard integrity checks module;
    wherein the navigation filter includes a main filter, a first filter branch of the main filter, a second filter branch of the main filter, and a third filter branch of the main filter.

3. The method of claim 2, wherein the main filter incorporates the DME/VOR measurements from all in view ground beacons, and the GNSS measurements from all in view GNSS satellites, to compute the main filter navigation solution.

4. The method of claim 2, wherein the first filter branch includes a first main filter that incorporates the DME/VOR measurements from set A, and a first sub-filter set that includes one or more sub-filters that incorporate the DME/

VOR measurements in one or more subsets of set A, where each sub-filter excludes a different DME/VOR measurement.

5. The method of claim 4, wherein the first main filter and the first sub-filter set are operative to compute the DME/VOR navigation solution based on set A, and the one or more subsets of set A, using solution separation.

6. The method of claim 2, wherein the second filter branch includes a second main filter that incorporates the GNSS measurements from set C, and a second sub-filter set that includes one or more sub-filters that incorporate the GNSS measurements in one or more subsets of set C, where each sub-filter excludes a different GNSS measurement.

7. The method of claim 6, wherein the second main filter and the second sub-filter set are operative to compute the GNSS navigation solution based on set C, and the one or more subsets of set C, using solution separation.

8. The method of claim 2, wherein the third filter branch includes a third main filter that incorporates the DME/VOR measurements from set B and one or more subsets of the GNSS measurements in set C, and a third sub-filter set that includes one or more sub-filters that incorporate the DME/VOR measurements from set B and the GNSS measurements in one or more subsets of set C, where each sub-filter excludes a different GNSS measurement.

9. The method of claim 8, wherein the third main filter and the third sub-filter set are operative to compute the combined navigation solution based on set B, and the one or more subsets of set C, using solution separation.

10. The method of claim 2, wherein the integrity checks module performs a process comprising:
performing a first fault detection and exclusion (FDE) using the first filter branch to determine which of the DME/VOR measurements in set A are consistent; and
outputting the consistent DME/VOR measurements as set B;
wherein the first FDE employs discriminators, thresholds, and protection levels to determine which of the DME/VOR measurements in set A are consistent.

11. The method of claim 10, wherein the integrity checks module performs a process comprising:
performing a second FDE using the second filter branch to determine which of the GNSS measurements in set C are consistent; and
outputting the consistent GNSS measurements as set D;
wherein the second FDE employs discriminators, thresholds, and protection levels to determine which of the GNSS measurements in set C are consistent.

12. The method of claim 11, wherein the integrity checks module performs a process comprising:
performing a third FDE using the third filter branch to determine which of the GNSS measurements in set C are consistent with the DME/VOR measurements in set B; and
outputting the consistent GNSS measurements as set E;
wherein the third FDE employs discriminators, thresholds, and protection levels to determine which of the GNSS measurements in set C are consistent.

13. The method of claim 1, wherein the vehicle is an unmanned aircraft systems (UAS) vehicle, or an urban air mobility (UAM) vehicle.

14. A system, comprising:
at least one processor onboard a vehicle;
a navigation filter hosted by the at least one processor, the navigation filter including a main filter, a first filter branch of the main filter, a second filter branch of the main filter, and a third filter branch of the main filter;
an integrity checks module hosted by the at least one processor, the integrity checks module in operative communication with the navigation filter;
an inertial measurement unit (IMU) onboard the vehicle, the IMU operative to produce inertial measurements for the vehicle;
a strapdown inertial navigation system (INS) onboard the vehicle, the strapdown INS in operative communication with the navigation filter and the IMU, the strapdown INS operative to produce estimated vehicle kinematic state statistics based on the inertial measurements from the IMU;
a distance measuring equipment (DME) and/or very high frequency (VHF) omni-directional range (VOR) receiver onboard the vehicle and selectively coupled to the navigation filter, the DME/VOR receiver operative to receive a set of DME/VOR measurements from in view ground beacons (set A); and
a global navigation satellite system (GNSS) receiver onboard the vehicle and selectively coupled to the navigation filter, the GNSS receiver operative to receive a set of GNSS measurements from in view GNSS satellites (set C);
wherein the navigation filter is configured to receive the estimated vehicle kinematic state statistics from the strapdown INS;
wherein the navigation filter and the integrity checks module are configured to operate together to assure integrity of the DME/VOR measurements by a process that comprises:
compute a main filter navigation solution for the vehicle, based on the DME/VOR measurements in set A, and the GNSS measurements in set C;
compute a DME/VOR navigation solution based on set A, and one or more subsets of set A, using solution separation;
identify the DME/VOR measurements in set A that provide a consistent DME/VOR position of the vehicle (set B), based on the DME/VOR navigation solution;
compute a branch DME/VOR only navigation solution based on the DME/VOR measurements in set B;
compute a GNSS navigation solution based on set C, and one or more subsets of set C, using solution separation;
identify the GNSS measurements in set C that provide a consistent GNSS position of the vehicle (set D), based on the GNSS navigation solution;
compute a branch GNSS only navigation solution based on the GNSS measurements in set D; and
verify whether the branch GNSS only navigation solution is consistent with the branch DME/VOR only navigation solution;
if the branch GNSS only navigation solution is consistent with the branch DME/VOR only navigation solution, then output the main filter navigation solution;
if the branch GNSS only navigation solution is inconsistent with the branch DME/VOR only navigation solution, then the process further comprises:
compute a combined navigation solution using the DME/VOR measurements in set B, and one or more subsets of the GNSS measurements in set C, using solution separation;
identify the GNSS measurements in the one or more subsets of set C that provide a consistent GNSS position of the vehicle (set E), with respect to the DME/VOR position of the vehicle;

compute a branch combined navigation solution based on set E; and verify whether the branch combined navigation solution is consistent with the branch DME/VOR only navigation solution;

if the branch combined navigation solution is consistent with the branch DME/VOR only navigation solution, then output the branch combined navigation solution;

if the branch combined navigation solution is inconsistent with the branch DME/VOR only navigation solution, then output the branch DME/VOR only navigation solution.

15. The system of claim 14, wherein the first filter branch includes a first main filter that incorporates the DME/VOR measurements from set A, and a first sub-filter set that includes one or more sub-filters that incorporate the DME/VOR measurements in one or more subsets of set A, where each sub-filter excludes a different DME/VOR measurement;

wherein the first main filter and the first sub-filter set are operative to compute the DME/VOR navigation solution based on set A, and the one or more subsets of set A, using solution separation.

16. The system of claim 15, wherein the second filter branch includes a second main filter that incorporates the GNSS measurements from set C, and a second sub-filter set that includes one or more sub-filters that incorporate the GNSS measurements in one or more subsets of set C, where each sub-filter excludes a different GNSS measurement;

wherein the second main filter and the second sub-filter set are operative to compute the GNSS navigation solution based on set C, and the one or more subsets of set C, using solution separation.

17. The system of claim 16, wherein the third filter branch includes a third main filter that incorporates the DME/VOR measurements from set B and one or more subsets of the GNSS measurements in set C, and a third sub-filter set that includes one or more sub-filters that incorporate the DME/VOR measurements from set B and the GNSS measurements in one or more subsets of set C, where each sub-filter excludes a different GNSS measurement;

wherein the third main filter and the third sub-filter set are operative to compute the combined navigation solution based on set B, and the one or more subsets of set C, using solution separation.

18. The system of claim 14, wherein the integrity checks module is operative to:

perform a first fault detection and exclusion (FDE) in conjunction with the first filter branch to determine which of the DME/VOR measurements in set A are consistent; and output the consistent DME/VOR measurements as set B;

wherein the first FDE employs discriminators, thresholds, and protection levels to determine which of the DME/VOR measurements in set A are consistent.

19. The system of claim 18, wherein the integrity checks module is operative to:

perform a second FDE in conjunction with the second filter branch to determine which of the GNSS measurements in set C are consistent; and output the consistent GNSS measurements as set D;

wherein the second FDE employs discriminators, thresholds, and protection levels to determine which of the GNSS measurements in set C are consistent.

20. The system of claim 19, wherein the integrity checks module is operative to:

perform a third FDE in conjunction with the third filter branch to determine which of the GNSS measurements in set C are consistent with the DME/VOR measurements in set B; and output the consistent GNSS measurements as set E;

wherein the third FDE employs discriminators, thresholds, and protection levels to determine which of the GNSS measurements in set C are consistent.

* * * * *